(12) United States Patent
Zhong et al.

(10) Patent No.: US 10,779,012 B2
(45) Date of Patent: Sep. 15, 2020

(54) ERROR CONCEALMENT IN VIDEO COMMUNICATIONS SYSTEMS

(71) Applicant: Agora Lab, Inc., Santa Clara, CA (US)

(72) Inventors: Sheng Zhong, Santa Clara, CA (US); Wei Dai, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 63 days.

(21) Appl. No.: 16/209,939

(22) Filed: Dec. 4, 2018

(65) Prior Publication Data

US 2020/0177926 A1 Jun. 4, 2020

(51) Int. Cl.
| | |
|---|---|
| *H04N 19/895* | (2014.01) |
| *H04N 19/625* | (2014.01) |
| *H04N 19/176* | (2014.01) |
| *H04N 19/159* | (2014.01) |
| *H04N 19/61* | (2014.01) |

(52) U.S. Cl.
CPC ......... *H04N 19/895* (2014.11); *H04N 19/159* (2014.11); *H04N 19/176* (2014.11); *H04N 19/61* (2014.11); *H04N 19/625* (2014.11)

(58) Field of Classification Search
None
See application file for complete search history.

(56) References Cited

U.S. PATENT DOCUMENTS

| | | | | |
|---|---|---|---|---|
| 2012/0033741 | A1* | 2/2012 | Nassor | H04N 19/395 |
| | | | | 375/240.25 |
| 2012/0297274 | A1* | 11/2012 | Zhang | H04N 19/89 |
| | | | | 714/776 |
| 2018/0035123 | A1* | 2/2018 | Wennersten | H04N 19/503 |
| 2018/0035127 | A1* | 2/2018 | Fuldseth | H04N 19/139 |

\* cited by examiner

*Primary Examiner* — William C Vaughn, Jr.
*Assistant Examiner* — Joseph Daniel A Towe

(57) ABSTRACT

A method, an apparatus, and a system for error concealment of video communications include determining, by a processor in an encoding process, a current block of a current slice of a current picture of a video sequence for error concealment, determining recovery data of the current block, wherein the recovery data comprises at least one of a coefficient of a discrete transform performed to the current block and similarity data associated with a first block similar to the current block, and the first block is in a first slice different from the current slice, and transmitting the current block and the recovery data using a network, wherein the current block is transmitted as in-band data and the recovery data is transmitted as out-of-band data.

16 Claims, 9 Drawing Sheets

ERROR CONCEALMENT IN VIDEO COMMUNICATIONS SYSTEMS

TECHNICAL FIELD

This disclosure relates to video communications, and in particular, to error concealment in network-based video communications systems.

BACKGROUND

In modern communication systems, video data can be transmitted through the internet between terminal devices or "terminals." For example, in real-time video communications, a sender of the video data can be an end-user terminal (e.g., a mobile device or a personal computer). For an on-demand video streaming service, the sender of the video data can be a server in a cloud. A receiver of the video data is usually another end-user terminal.

The video data is usually encoded, compressed, and packetized as a set of data packets for transmission over a network. Due to jitters in the network, the data packets can be lost during transmission, or corrupted or damaged when arriving at the receiver. In such cases, the receiver cannot correctly decode the video data, causing video artifacts or communications interruptions. For a video encoded by a coding standard such as MPEG-2, H.264, or H.265, a slice containing a lost packet or corrupted bits can only be decoded partially. When the partially decoded picture is a reference picture for decoding the following pictures, the artifacts would be propagated and accumulated.

Error concealment techniques can be used to restore the lost or damaged video data. However, if the loss and damage is severe or other data strongly depend on the lost or damaged data, the effect of the error concealment can be challenged in a very jittering network.

SUMMARY

Disclosed herein are implementations of methods, apparatuses, and systems for error concealment of video communications.

In one aspect, a method for error concealment of video communications is disclosed. The method includes determining, by a processor in an encoding process, a current block of a current slice of a current picture of a video sequence for error concealment, determining recovery data of the current block, wherein the recovery data comprises at least one of a coefficient of a discrete transform performed to the current block and similarity data associated with a first block similar to the current block, and the first block is in a first slice different from the current slice, and transmitting the current block and the recovery data using a network, wherein the current block is transmitted as in-band data and the recovery data is transmitted as out-of-band data.

In another aspect, a method for error concealment of video communications is disclosed. The apparatus includes receiving, by a processor, a video stream as in-band data and recovery data as out-of-band data, wherein the recovery data is for error concealment of a current block of a current slice of a current picture of the video stream, based on a determination that packets of the current block is missing or corrupted in the video stream, determining, from the recovery data, at least one of a coefficient of a discrete transform performed to the current block and similarity data associated with a first block similar to the current block, wherein the first block is in a first slice different from the current slice, and recovering the current block using the recovery data.

In another aspect, an apparatus for error concealment of video communications is disclosed. The apparatus includes a processor and a memory. The memory is coupled to the processor and configured to store instructions which when executed by the processor become operational with the processor to reconstruct a first picture from compressed pictures of a video sequence in an encoding process, wherein the first picture comprises a first slice comprising a first block, determine recovery data for error concealment of the first block, the recovery data comprising at least one of a coefficient of a discrete transform performed to the current block, similarity data associated with a second block similar to the first block, and similarity data associated with a third block similar to the first block, wherein the second block is in the first picture, and the third block is in a second picture reconstructed from the compressed pictures, compress the recovery data as compressed recovery data, and transmit the first picture and the compressed recovery data using a network, wherein the first picture is transmitted as in-band data and the compressed recovery data is transmitted as supplemental enhancement information (SEI) data.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
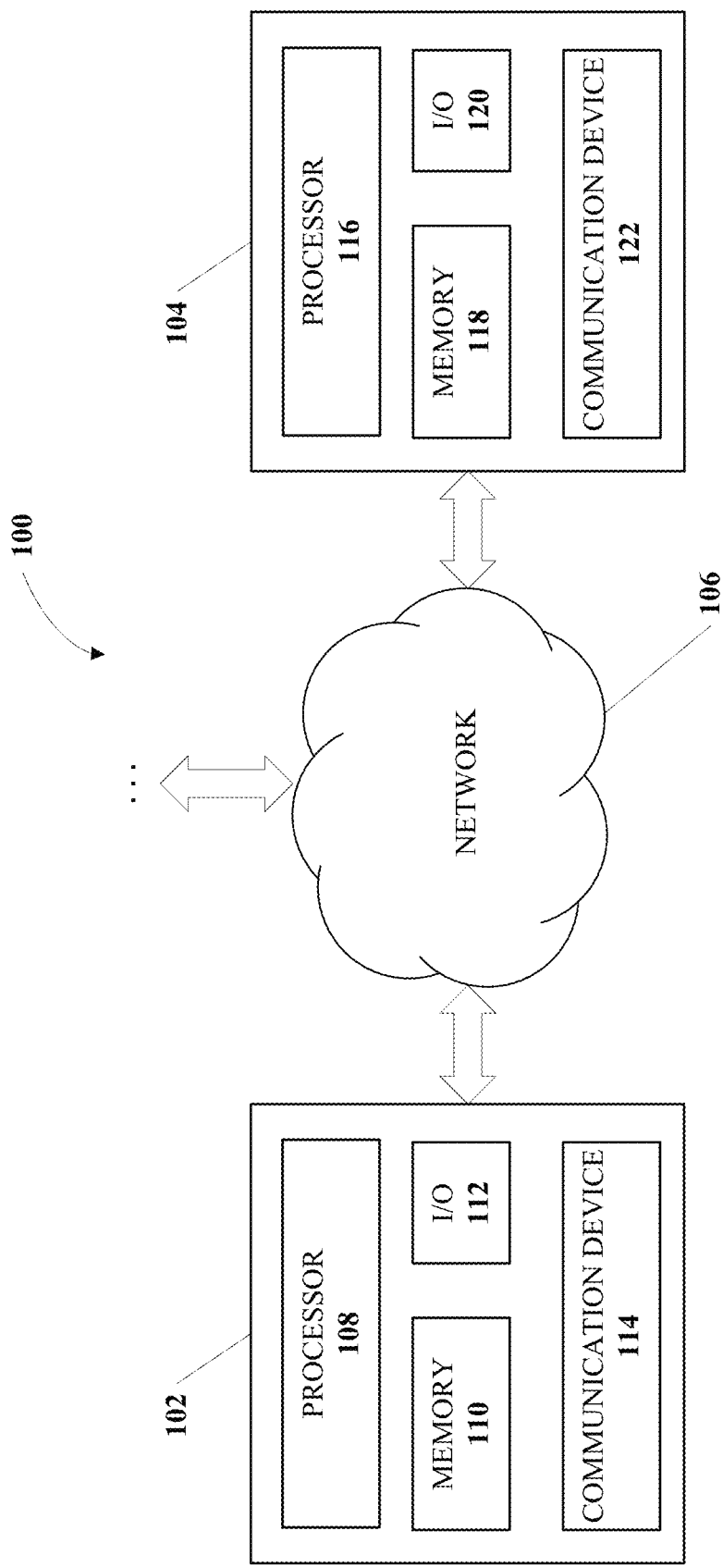
FIG. 1 is a diagram of an example system of video communications according to implementations of this disclosure.

Video data can be stored in its original form or converted as a video stream. The video stream can include time sequence data (e.g., a video sequence including multiple pictures or frames), feature-extracted residuals of the video stream (e.g., a residual picture after inter-prediction for a current picture in a video sequence), or equivalent quantities of the video stream in a transformed domain (e.g., transformed and/or quantized coefficients). The video stream can be encoded (or "compressed") into a compressed video stream (e.g., a video bitstream) for transmission over a network. The compressed video stream can be transmitted over a network (e.g., the Internet) in a form of data packets (or "packets" for simplicity).

In this disclosure, a logical unit (or a "processing unit") of video data for video coding is referred to as a "block." The blocks can be grouped, forming a special region or partition of the picture. In other words, the picture can be divided into one or more regions or partitions, and each region or partition can include one or more blocks. Such regions or partitions can be referred to as "slices," "tiles," or any other name depending on the video coding standards. For ease of explanation without causing ambiguity, such regions or partitions are referred to as "slices" hereinafter unless explicitly described otherwise herein.

Depending on video coding standards, the blocks can be referred to as a "prediction block," a "macroblock," a "coding unit" (CU), a "coding tree unit" (CTU), or a "coding tree block" (CTB). In some video coding standards, a block can be further partitioned to multiple logical sub-units of video data for video coding. For example, in MPEG-2, the logical unit is a macroblock (MB). The MB can include logical sub-units in a YCbCr color space, such as a luma component Y, a chroma component Cb, and a chroma component Cr.

For error concealment, a retransmission strategy or a redundancy strategy can be used. In the retransmission strategy, one or more copies of the current block can be simultaneously transmitted from a sender to a receiver, or re-transmitted by the sender upon request from the receiver when data loss or corruption occurs. However, for a limited-bandwidth network, the retransmission strategy can occupy additional bandwidth and cause a network traffic jam that could aggravate packet loss or corruption, which can cause more delay for the receiver to receive the retransmitted packets.

In the redundancy strategy, for a current block of a current picture of a video stream, contents of blocks spatially neighboring the current block or contents of blocks co-located with the current block in a previous picture of the video stream can be used to determine recovery data for recovering video data lost or corrupted during transmission. For example, the recovery data can include compressed contents of a block similar to the current block, which is found in a search range. However, if the spatially neighboring blocks are in the same slice as the current block, when video data of the slice is lost or corrupted, the recovery data has a high possibility of also being lost or corrupted. When only co-located blocks are used to determine the recovery data for the current block, the similarity of the recovery data to the current block can be limited.

In this disclosure, methods, apparatuses, and systems are disclosed to determine recovery data for error concealment of a block using contents of another block in a different slice. The recovery data is transmitted as out-of-band data over a network while the compressed video data is transmitted as in-band data. In some video coding standards (e.g., H.264 or H.265), the out-of-band data can be in a form of supplemental enhancement information (SEI) messages. The recovery data can be designed to be small-sized and suitable to be transmitted using the out-of-band data. By determining the recovery data using contents of different slices, error resilience of the recovery data can be increased. By transmitting the recovery data as small-sized out-of-band data, usage of extra network bandwidth can be limited.

FIG. 1 is a diagram of an example system 100 for video communications according to implementations of this disclosure. In FIG. 1, the system 100 can include multiple apparatuses and networks, such as an apparatus 102, an apparatus 104, and a network 106. The apparatuses can be implemented by any configuration of one or more computers, such as a microcomputer, a mainframe computer, a supercomputer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider (e.g., a web host or a cloud service provider). In some implementations, the computing device can be implemented in the form of multiple groups of computers that are at different geographic locations and can communicate with one another, such as by way of a network. While certain operations can be shared by multiple computers, in some implementations, different computers are assigned to different operations. In some implementations, the system 100 can be implemented using general-purpose computers with a computer program that, when executed, performs any of the respective methods, algorithms, and/or instructions described herein. In addition, or alternatively, for example, special-purpose computers/processors including specialized hardware can be utilized for carrying out any of the methods, algorithms, or instructions described herein.

The apparatus 102 can include a processor 108 and a memory 110. The processor 108 can be any type of device or devices capable of manipulating or processing data. The terms "signal," "data," and "information" are used interchangeably. The processor 108 can include any number of any combination of a central processor (e.g., a central processing unit or CPU), a graphics processor (e.g., a graphics processing unit or GPU), an intellectual property (IP) core, an application-specific integrated circuits (ASIC), a programmable logic array (e.g., a field-programmable gate array or FPGA), an optical processor, a programmable logic controller, a microcontroller, a microprocessor, a digital signal processor, or any other suitable circuit. The processor 108 can also be distributed across multiple machines (e.g., each machine or device having one or more processors) that can be coupled directly or connected via a network.

The memory 110 can be any transitory or non-transitory device capable of storing instructions and data that can be accessed by the processor (e.g., via a bus). The memory 110 herein can include any number of any combination of a random-access memory (RAM), a read-only memory (ROM), a firmware, an optical disc, a magnetic disk, a hard drive, a solid-state drive, a flash drive, a security digital (SD) card, a memory stick, a compact flash (CF) card, or any suitable type of storage device. The memory 110 can also be distributed across multiple machines, such as a network-based memory or a cloud-based memory. The memory 110 can include data, an operating system, and an application. The data can include any data for processing (e.g., an audio stream, a video stream, or a multimedia stream). The application can include instructions executable by the processor 108 to generate control signals for performing functions of the methods or processes disclosed herein.

In some implementations, the apparatus 102 can further include a secondary storage device (e.g., an external storage device). The secondary storage device can provide additional memory when high processing needs exist. The secondary storage device can be any suitable non-transitory computer-readable medium, such as a ROM, an optical disc, a magnetic disk, a hard drive, a solid-state drive, a flash drive, a security digital (SD) card, a memory stick, or a compact flash (CF) card. Further, the secondary storage device can be a component of the apparatus 102 or can be a shared device accessible by multiple apparatuses via a network. In some implementations, the application in the memory 110 can be stored in whole or in part in the secondary storage device and loaded into the memory 110 as needed for processing.

The apparatus 102 can further include an input/output (I/O) device 112. The I/O device 112 can also be any type of input devices, such as a keyboard, a numerical keypad, a mouse, a trackball, a microphone, a touch-sensitive device (e.g., a touchscreen), a sensor, or a gesture-sensitive input device. The I/O device 112 can be any output device capable of transmitting a visual, acoustic, or tactile signal to a user, such as a display, a touch-sensitive device (e.g., a touchscreen), a speaker, an earphone, a light-emitting diode (LED) indicator, or a vibration motor. For example, the I/O device 112 can be a display to display a rendering of graphics data, such as a liquid crystal display (LCD), a cathode-ray tube (CRT), an LED display, or an organic light-emitting diode (OLED) display. In some cases, an output device can also function as an input device, such as a touchscreen.

The apparatus 102 can further include a communication device 114 to communicate with another apparatus via a network 106. The network 106 can be any type of communications networks in any combination, such as a wireless network or a wired network. The wireless network can include, for example, a Wi-Fi network, a Bluetooth network, an infrared network, a near-field communications (NFC) network, or a cellular data network. The wired network can include, for example, an Ethernet network. The network 106 can be a local area network (LAN), a wide area networks (WAN), a virtual private network (VPN), or the Internet. The network 106 can include multiple server computers (or "servers" for simplicity). The servers can interconnect with each other. The servers can also connect to end-user apparatuses, such as the apparatus 102 and the apparatus 104. The communication device 114 can include any number of any combination of device for sending and receiving data, such as a transponder/transceiver device, a modem, a router, a gateway, a wired network adapter, a wireless network adapter, a Bluetooth adapter, an infrared adapter, an NFC adapter, or a cellular antenna.

Similar to the apparatus 102, the apparatus 104 includes a processor 116, a memory 118, an I/O device 120, and a communication device 122. The implementations of elements 116-122 of the apparatus 104 can be similar to the corresponding elements 108-114 of the apparatus 102. For example, the apparatus 102 can be used as a decoding apparatus (referred to as a "decoder"), and the apparatus 104 can be used as an encoding device (referred to as an "encoder"), or vice versa. The apparatus 102 can communicate with the apparatus 104 via the network 106. The apparatuses 102 and 104 can also communicate with other apparatuses (not shown) connected to the network 106. It should be noted that portions of the apparatuses 102 and 104 do not necessarily have to be implemented in the same manner.

It should also be noted that parts or components of the apparatuses 102 and 104 and the system 100 can include elements not limited to those shown in FIG. 1. Without departing from the scope of this disclosure, the apparatuses 102 and 104 and the system 100 can include more or fewer parts, components, and hardware or software modules for performing various functions in addition or related to encoding and decoding.

When encoding a video stream (also referred to as a "video sequence"), each picture of the video stream can be encoded using information within the same picture or information between different pictures for prediction, referred to as "intra-picture prediction" (or "intra-prediction") and "inter-picture prediction" (or "inter-prediction"), respectively. In inter-prediction, motion estimation (ME) and motion compensation (MC) can be performed between at least two different pictures. A picture coded using intra-prediction can be referred to as an "I-picture," and a picture coded using inter-prediction can be referred to as a "P-picture." When decoding, the I-picture can be decoded without referencing another picture. The P-picture can be decoded using another picture as a reference (referred to as a "reference picture"). The reference picture can be an I-picture or another P-picture. The encoder can decide the mode of prediction for a picture being encoded (referred to as a "current picture"). When a picture is being decoded (also referred to as a "current picture"), the decoder can determine which mode of prediction to use based on information received and extracted from a header of the current picture. Details of a structure of a video stream will be described in FIG. 2. Details of the video encoding and decoding processes will be described in FIGS. 3-4.

Figure 2:
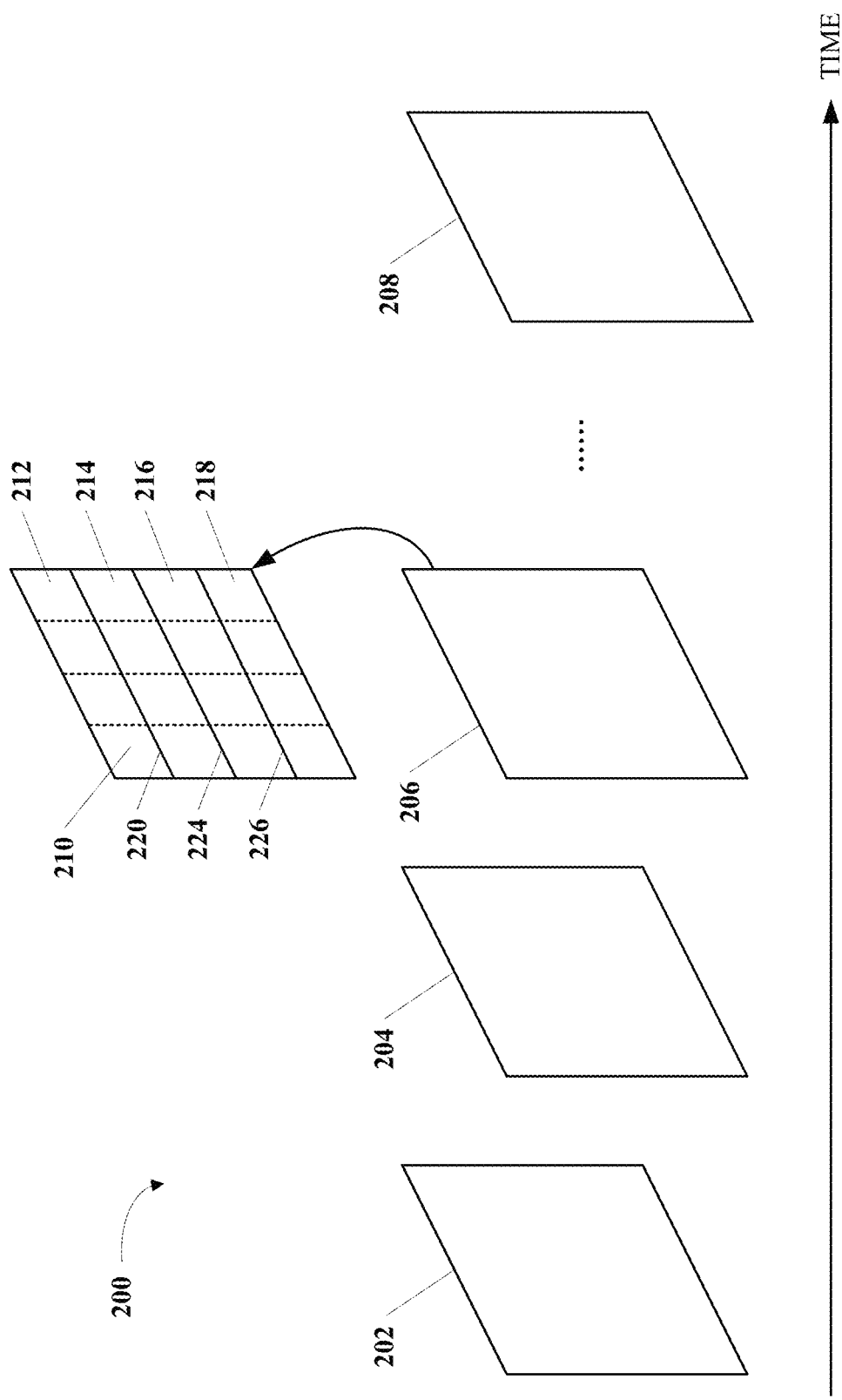
FIG. 2 is a diagram of example pictures of a video stream.

FIG. 2 shows example pictures of a video stream 200. The video stream 200 can be a video source stream for encoding or a video stream decoded from a video bitstream. A timeline is shown in FIG. 2, the arrow of which indicates the direction of time. The video stream 200 can include a series of pictures along the timeline, including pictures 202-208. For example, the picture 208 can be the current picture. If the picture 208 is being encoded or decoded using inter-prediction, its reference picture can be temporally prior to the picture 208 (e.g., the picture 208 is a P-picture), after the picture 208 (e.g., the picture 208 is a B-picture), or both prior to and after the picture 208 (e.g., the picture 208 is a BP-picture). For ease of explanation, without causing any ambiguity, P-pictures will be used as examples in the following description. However, it should be understood that the following description does not limit the temporal position of the reference pictures and can also apply to B-pictures and BP-pictures, unless explicitly stated otherwise. For example, if the picture 208 is a P-picture, its reference picture can be the picture 206, 204, 202, or any picture earlier in the timeline than the picture 208.

Each picture of the video stream 200 can be divided into multiple blocks. ME and MC can be performed on the level of the blocks. The size and shape of the blocks can be arbitrary, such as 8×8, 8×16, 16×16, 32×32, 64×64, or any size in any shape suitable for encoding a region of the picture. Typically, the more details the region includes, the smaller the block sizes can be. For example, in FIG. 2, the picture 206 can be shown to have 4×4 blocks, including a block 210. The boundaries of the blocks are shown in dotted lines.

The pictures of the video stream 200 can be divided into slices. For example, the picture 206 can be divided into four slices 212-218, each slice having four blocks. The slices 212-218 can have boundaries 220-226 in between, shown as solid lines. Slices can be used for parallel processing. The encoding can be performed simultaneously and independently for the slices. For example, the slices 212-218 can be parallelly processed, which can increase the efficiency of video encoding. Similarly, the slices can also be parallelly decoded at a decoder. Slices of an I-picture can be I-slices, and slices of a P-picture can be P-slices.

It should be noted that the slice herein can include any number of any blocks in any configuration and is not limited to the aforementioned examples. For example, the slice can be in a non-rectangular shape, such as including blocks of different rows (not shown). For another example, the slice can include blocks grouped in a non-contiguous manner, such as two or more non-contiguous block groups. For another example, a part of a first slice can be within a part of a second slice. For another example, the first slice can be enclosed by the second slice (e.g., the first slice can be within the second slice).

It should also be noted that the division or segmentation of the slices can be changed or unchanged in the video stream. In other words, the boundaries between the slices can be changed or unchanged. In some implementations, the pictures of the video stream can be divided into slices in the same pattern. In some implementations, the pattern of the slice division can change between different sets of pictures of the video stream.

Figure 3:
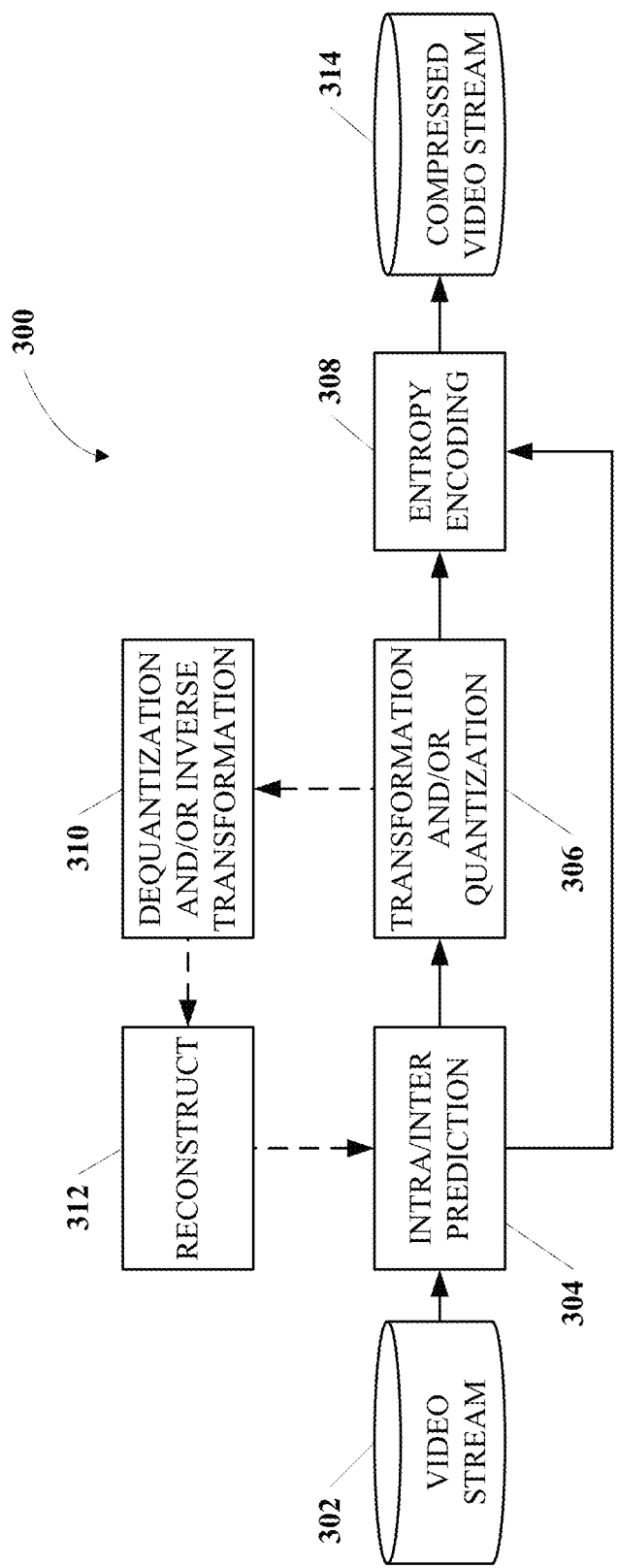
FIG. 3 is a diagram of an example encoding process according to implementations of this disclosure.

FIG. 3 is a diagram of an example process 300 that can be used to encode a video stream 302 according to implementations of this disclosure. The video stream 302 can include a video sequence. The process 300 can be implemented as software and/or hardware modules in the system 100 in FIG. 1. For example, the process 300 can be implemented as modules included in an encoder (e.g., the apparatus 104 in FIG. 1). The process 300 includes operations 304-308 to produce as an output a compressed video stream 314 from a video stream 302. The example encoding process 300 (either the whole process or some stages) can be further modified when implementing error concealment as described in FIGS. 5 and 7 described below. In some instances, the process 300 may not be necessary for the implementations of error concealment.

Referring to the process 300 in FIG. 3, the video stream 302 is received by an encoder. The term "receive" as used herein can refer to receiving, inputting, acquiring, retrieving, obtaining, reading, accessing, or any action for inputting information or data in any manner. For example, the video stream 302 can be a video sequence that includes a series of video pictures (e.g., a current picture).

Generally, an encoding process can include one or more of the following stages or operations: a prediction stage (e.g., for intra-prediction or inter-prediction), a transformation stage (with or without quantization), and an entropy encoding stage. The aforementioned stages can be used to output the compressed video stream 314 from the video stream 302 in a forward path of the encoding process, as shown by the solid connection lines in FIG. 3: an intra/inter prediction stage 304, a transformation and/or quantization stage 306, and an entropy encoding stage 308.

At the intra/inter prediction stage 304, for intra-prediction, a current block of the current picture can be predicted using previously coded block(s) from the current picture. For inter-prediction, the current block of the current picture can be predicted using previously coded pictures as reference data. Previously coded pictures can include, for example, previously encoded and reconstructed pictures, also referred to as reference pictures. For example, ME and MC can be performed using the current picture and one or more reference pictures to generate motion data. A residual, which is the difference between a predicted block and the current block, can be further transformed, quantized, and/or entropy encoded.

In some implementations, optionally, a loop filter (not shown) can be additionally applied before the entropy encoding stage 308. The loop filter can reduce distortion (e.g., blocking artifacts) introduced by the video compression. Other information used to decode the resultant video bitstream can also be entropy encoded, such as the prediction mode, transformation type, quantization level, and loop filter parameters (e.g., filter strength).

In some implementations, the process 300 can further include a reconstruction path for reconstructing reference data to be used for predicting a future picture. For example, the reconstruction path (shown by the dashed connection lines in FIG. 3) can include the following stages: a dequantization and/or inverse transformation stage 310 and a reconstruction stage 312. The stages 310 and 312 can be used to ensure that both the encoder (e.g., the apparatus 104 in FIG. 1) and the decoder (e.g., the apparatus 102 in FIG. 1) can use the same reference data for prediction. In some implementations, optionally, a loop filter (not shown) can be additionally applied after the stage 312. In other implementations, the reconstructed picture can be used without using the loop filter. The reconstruction can be similar to a reconstruction stage in a decoding process (e.g., stage 410 in FIG. 4).

It should be noted that other variations of the encoding process can be used to encode the video sequence. The encoding process can be performed in different orders, combined into fewer stages, and/or divided into more stages. For example, quantization or transform can be optional in some implementations. As an example, a non-transform-based encoder can quantize the residual data without transformation.

Figure 4:
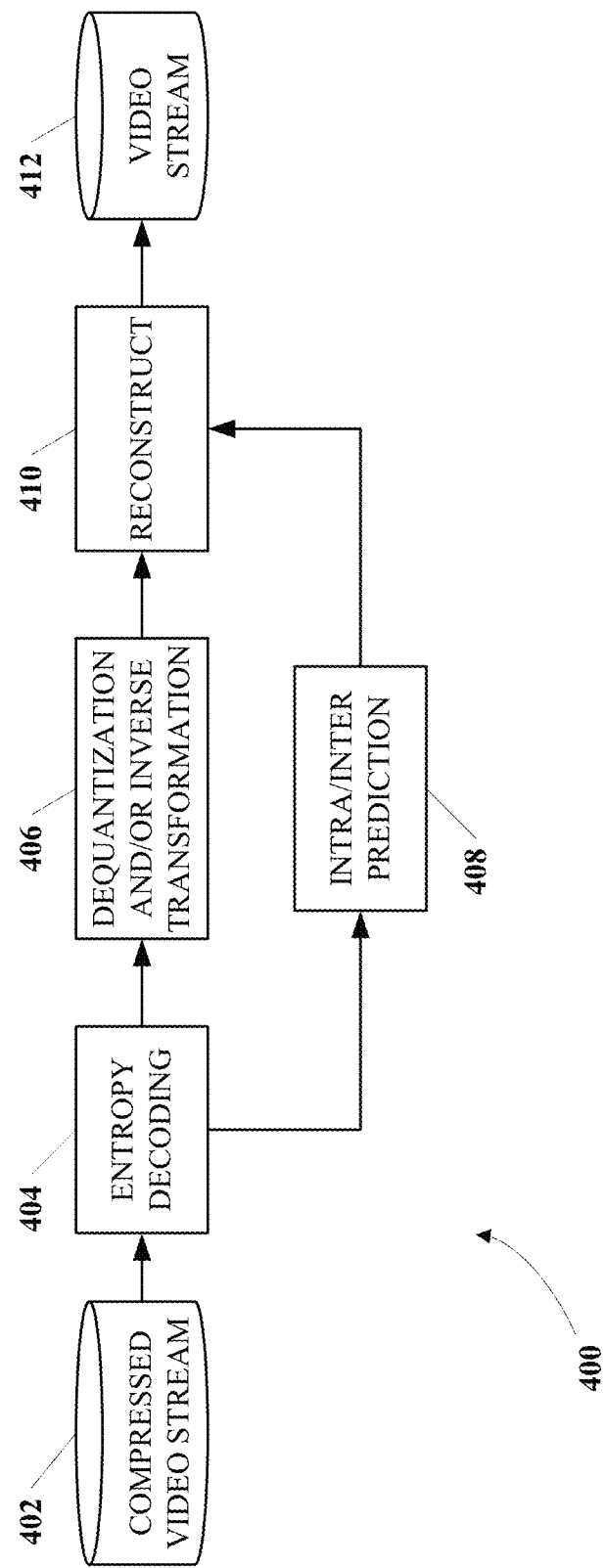
FIG. 4 is a diagram of an example decoding process according to implementations of this disclosure.

FIG. 4 is a diagram of an example process 400 that can be used to decode a compressed video stream according to implementations of this disclosure. The process 400 can be implemented as software and/or hardware modules in the system 100 in FIG. 1. For example, some or all stages of the process 400 can be implemented as software or hardware modules included in the system 100 by a decoder (e.g., the apparatus 102). The decoder can be implemented by program codes stored in memory (e.g., the memory 110). The program codes can include computer-readable instructions that, when executed by a processor (e.g., the processor 108), cause the decoder to decode a compressed video stream in the manner described in FIG. 4. The decoder can also be implemented as specialized hardware included in an apparatus (e.g., the apparatus 102). For example, the decoder can be a hardware decoder. The process 400 includes operations 404-410 to reconstruct a video stream 412 from a compressed video stream 402. In addition, the example decoding process 400 (either the whole process or some stages) can be modified when implementing error-concealment enabled decoding in FIG. 6 described below.

Generally, when decoding a compressed video stream, the decoding process is similar to the reconstruction path of the video encoding process. The process 400, similar to the reconstruction path of the process 300 discussed above, can include the following stages: an entropy decoding stage 404, a dequantization and/or inverse transformation stage 406, an intra/inter prediction stage 408, and a reconstruction stage 410. The reconstructed picture can be used as future reference data for processing a future picture successive to the current picture. In addition to being outputted in the video stream 412, the reconstructed picture can also be stored in a buffer (e.g., in the memory 110 in FIG. 1) to be used as the future reference data. In some implementations, the reconstructed picture can be filtered using a loop filter (not shown). Other structural variations of the process 400 can be used to decode the compressed video stream 402.

Figure 5:
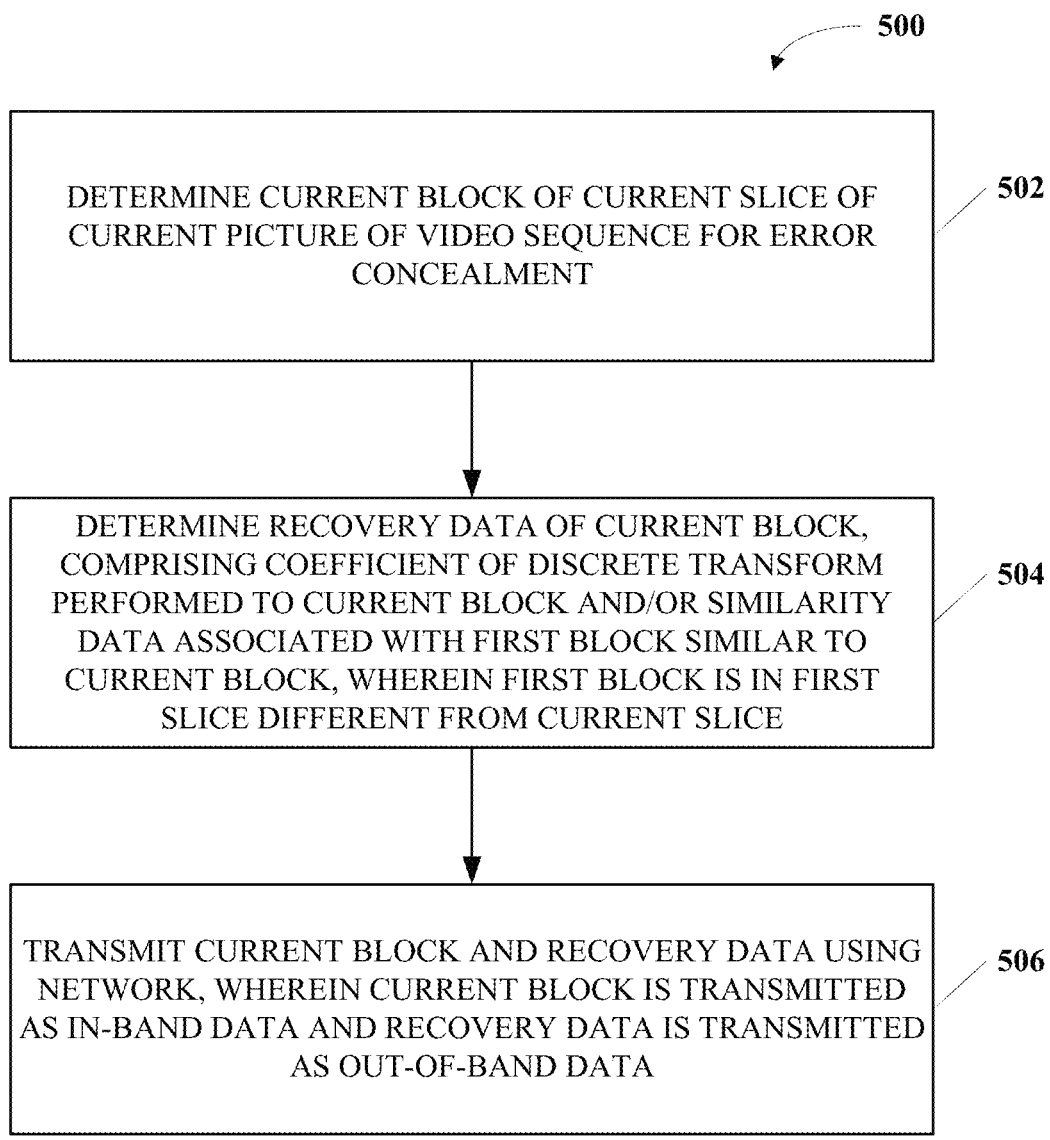
FIG. 5 is a flowchart of an example process for error concealment for a video encoding process according to implementations of this disclosure.

FIG. 5 is a flowchart of an example process 500 for error concealment for a video encoding process according to implementations of this disclosure. The process 500 can be implemented as software and/or hardware modules in the system 100 in FIG. 1. For example, the process 500 can be implemented as software modules of a server in the network 106. The process 500 can also be implemented as of software modules of an end-user apparatus (e.g., the apparatus 102). The software modules can be stored in a memory (e.g., the memory 110) as instructions and/or data executable by a processor (e.g., the processor 108). The process 500 can also be implemented in hardware as a specialized chip storing instructions executable by the specialized chip. For example, the specialized chip can include a special hardware acceleration module.

It should be noted that the process 500 can be implemented as an integrated or independent process of a video encoding process (e.g. the process 300). That is, operations of the process 500 can be implemented as additional or integrated operations of the process 300, or as independent operations that are performed separately from the process 300. If the process 500 is implemented as independent from the process 300, it can be implemented before, concurrent with, or after the performing of the process 300.

At operation 502, a current block of a current slice of a current picture of a video sequence is determined in an encoding process for error concealment. The current block can be encoded by a processor (e.g. the processor 108 or 116). For example, the block can be encoded through stages 304-312 of the process 300. In some implementations, the current block can be an MB, a CU, a CTU, or any logical unit of video data for video coding, depending on different video coding standards. For example, when H.264 or H.265 is used, the block can be a CU, a CTU, or a CTB. For another example, when MPEG-2 is used, the block can be an MB.

It should be also noted that the picture partition scheme for error concealment can be independent from the picture partition scheme for encoding the current picture. That is, the sizes, shapes, and numbers of blocks and slices used for encoding the current picture can be different from the sizes, shapes, and numbers of blocks and slices used for the error concealment. For example, the granularity of the partition schemes for the above two purposes can be different. For example, a block size of 8×8 can be used for encoding the current picture, and a block size of 16×16 can be used for error concealment of the current picture. For error concealment, non-standard sizes of blocks can be used. For another example, the current picture can be partitioned to a first number (e.g., 3) slices for encoding and partitioned to a second number (e.g., 4) slices for error concealment.

At operation 504, recovery data of the current block is determined. In some implementations, the recovery data can include similarity data associated with a first block that is similar to the current block. In some implementations, the recovery data can include non-similarity data associated with the current block. For example, the non-similarity data can include a coefficient of a discrete transform performed to the current block. In some implementations, the recovery data can include the similarity data associated with the first block and the non-similarity data (e.g., the coefficient of the discrete transform performed to the current block). The first block is in a first slice different from the current slice. For example, the first slice can be a slice of the current picture other than the current slice. For another example, the first slice can be a slice of another picture (e.g., a previous picture) other than the current picture.

In some implementations, the recovery data can be determined after reconstructing (e.g., as an output of the reconstruction stage 312 in the reconstruction path as shown in FIG. 3) the current block, the current slice, or the current picture. In some implementations, the recovery data can be determined before reconstructing the current block, the current slice, or the current picture. For example, the current picture that includes the current slice and the current block can be an original picture. That is, the recovery data can be determined using original video data.

In some implementations, the first block can be determined as a best-matching block of the current block within a search range. The search range can be associated with the current block and exclude the current slice. For example, the search range can include a slice near the current block (e.g., a neighboring slice) of the current picture, but not the current slice. For another example, the search range can include a slice (e.g., near a block co-located with the current block) of a previous picture. As used herein, the term "co-located" refers to two slices in two respective pictures having the same size, same shape, and same location in the picture. The location of a slice in a picture refers to the relative position of the slice within the picture. The location can be determined using a part of the slice as a reference point. For example, the reference point can be within a block of the slice at the center, a corner, a boundary, or any position of the slice. For example, for two slices in two pictures having the same size and shape, if the top left corners of the two slices have the same positions (e.g., coordinates) in the picture, the two slices are referred to as "co-located."

In some implementations, the search range can include at least two slices. The at least two slices can be in the same or different pictures. For example, the search range can include a slice (not the current slice) of the current picture and a slice of the previous picture. The search range can include two different slices of the current picture (neither being the current slice). The search range can include two different slices of the previous picture. The search range can include a slice of a first previous picture and a slice of a second previous picture. It should be noted that, when the search range includes at least two slices, they can be any different slices and not limited to the examples as described above.

It should also be noted that blocks in the current slice are excluded from the search range. Because a packet loss or bit error can result in corrupting a slice. When the first block is in the current slice and the current slice is corrupted, blocks of the current slice are very likely to be undecodable, including the first block. Searching the first block in a slice other than the current slice can reduce such a risk.

When the search range includes multiple slices, multiple blocks similar to the current block (referred to as "matching blocks" hereinafter) can be determined. For example, a best-matching block can be determined for each of the slices. For example, when the search range includes a slice of the current picture and a slice of the previous picture, a first best-matching block can be determined in the slice of the current picture, and a second best-matching block can be determined in the slice of the previous picture.

To determine the matching block, a block-matching technique can be applied in the search range. The block-matching technique can include, for example, an Exhaustive Search, a Three Step Search, a Two Dimensional Logarithmic Search, a New Three Step Search, a Simple And Efficient Search, a Four Step Search, a Diamond Search, an Adaptive Rood Pattern Search, or any combination of any block-matching algorithms suitable for determining similarity between two blocks of a picture. It should be noted that the block-matching algorithms used herein are not limited to the aforementioned examples.

In some implementations, the block-matching technique can use a matching criterion to determine whether a block matches (e.g., exceeds a similarity threshold value) with the current block. A block that matches with the current block can be referred to as a candidate matching block. Candidate matching blocks can be sorted or ranked to determine the best-matching block (e.g., the block having the highest similarity value). For example, the matching criterion can be a sum of absolute difference (SAD) between a candidate matching block and the current block. The best-matching block can be the candidate matching block that has the smallest SAD. When performing the block-matching technique, different levels of search precision can be used, such as an integer-pel precision or a subpixel (e.g., half-pel or quarter-pel) precision.

Figure 9:
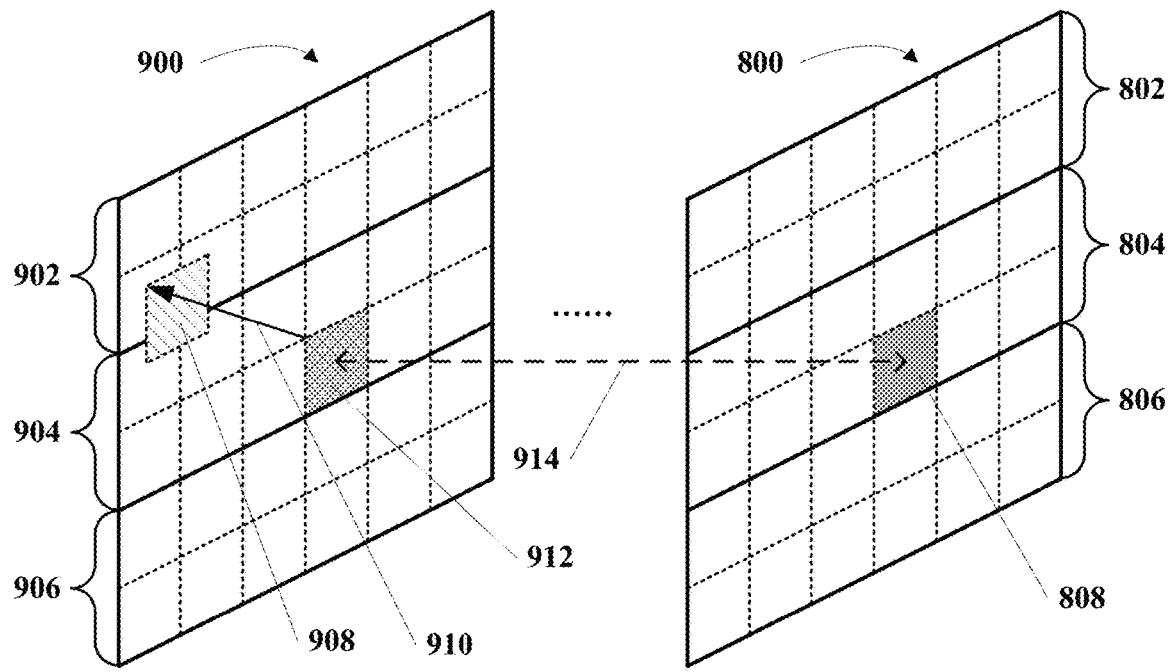
FIG. 9 is a diagram of another example similarity vector for error concealment according to implementations of this disclosure.
Figure 10:
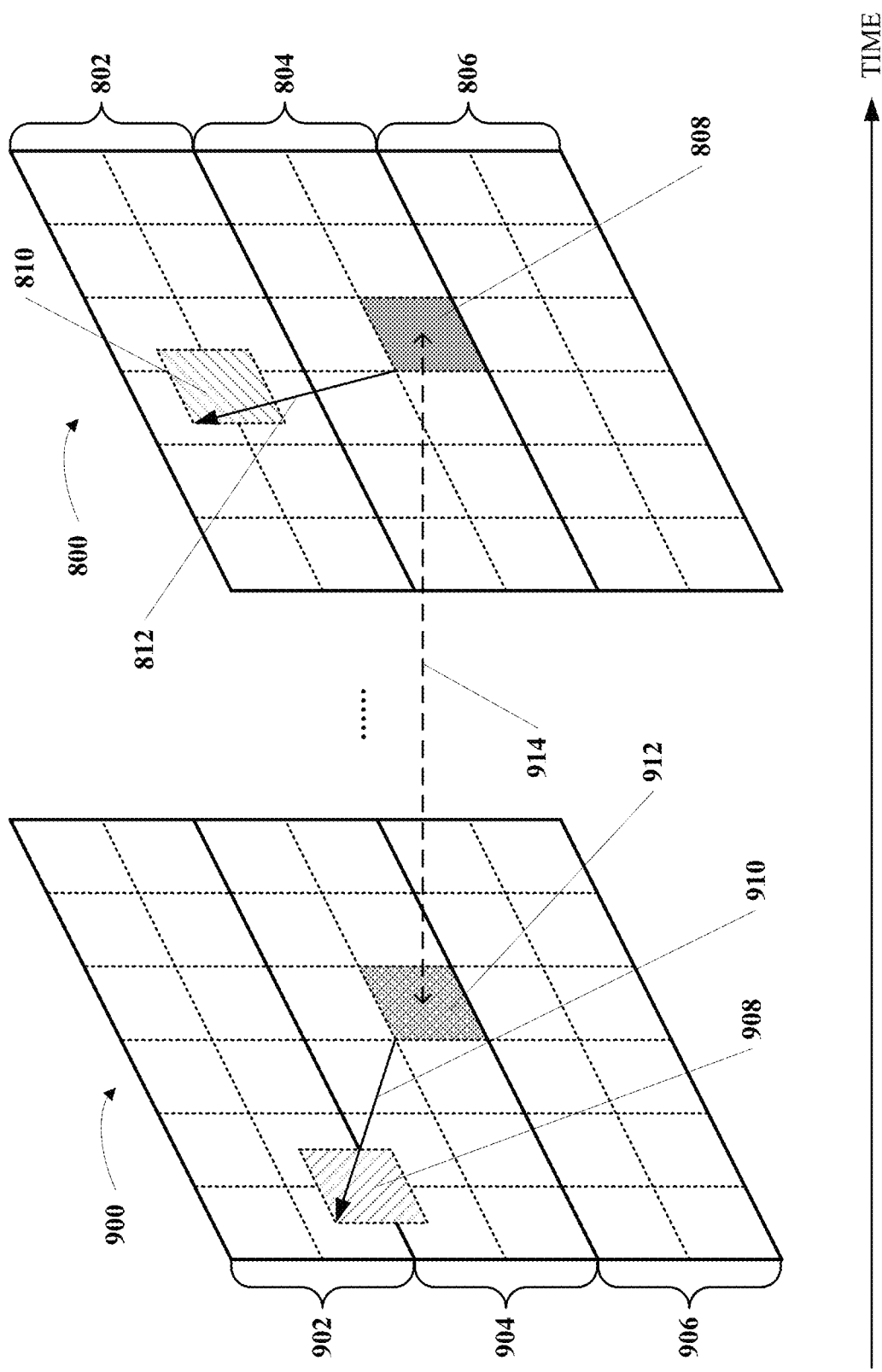
FIG. 10 is a diagram of two example similarity vectors for error concealment according to implementations of this disclosure.

In some implementations, the similarity data associated with the first block can include a similarity vector indicative of a position of the first block relative to the current block. Examples of the similarity vector are shown in FIGS. 8-10.

Figure 8:
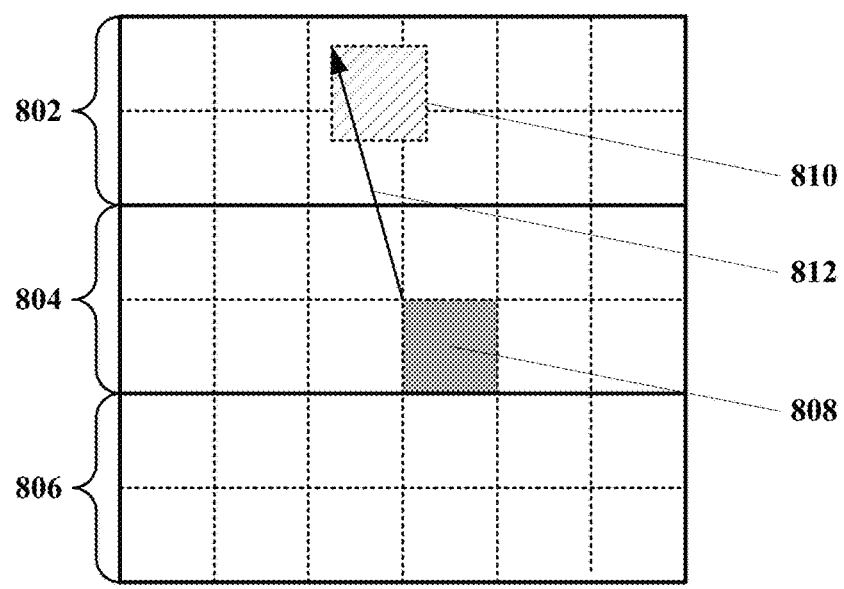
FIG. 8 is a diagram of an example similarity vector for error concealment according to implementations of this disclosure.

FIG. 8 is a diagram of an example similarity vector for error concealment according to implementations of this disclosure. In FIG. 8, a picture 800 can represent the current picture. The picture 800 includes 6×6 blocks (indicated by dotted lines) that are divided into slices 802, 804, and 806 (indicated by solid lines). It should be noted that the blocks and slices of the picture 800 are only examples, and the division or partition of the current picture can be in other forms.

In FIG. 8, the recovery data of a current block 808 in a current slice 804 is being determined. The recovery data can include similarity data associated with a first matching block 810. The first matching block 810 is determined to be the best-matching block of the current block 808 in a search range. The search range can be the slice 802 that is different from the current slice 804. The first matching block 810 can be determined by applying a block-matching technique in the slice 802. The block-matching technique can have a quarter-pel search precision, for example.

A similarity vector 812 can be determined to indicate a relative position between the first matching block 810 and the current block 808. Because the current block 808 and the first matching block 810 are in the same picture, the relative relationship therebetween can be described as spatial, and the similarity vector 812 can be referred to as a spatial similarity vector (SSV) 812. The similarity vector can be determined between two corresponding points of the first matching block 810 and the current block 808. For example, the SSV 812 can be a vector from a top left corner of the current block 808 to a top left corner of the first matching block 810. It should be noted that the two corresponding points that define the similarity vector can be at any location of a block, such as a top right corner, a bottom left corner, a bottom right corner, a center, or any arbitrary point of a block suitable for determining an endpoint of a vector. The SSV 812 and the first matching block 810 can be used to recover the current block 808 at a decoder if packets of the current block 808 are lost or corrupted. For example, after the first slice 802 being correctly decoded, based on the SSV 812 that is transmitted to the decoder (e.g., as out-of-band data), the first matching block 810 that has been decoded can be duplicate to replace the current block 808 when decoding the current slice 804.

In some implementations, a residue can be determined between the current block 808 and the first matching block 810. The residue can be associated with the SSV 812 (referred to as an "SSV-associated residue"). For example, the residue can be pixel value differences (e.g., as a result of subtraction) between pixels of the current block 808 and pixels of the first matching block 810. Correspondingly, the similarity data associated with the first matching block 810 can include the residue. The residue can be compressed, such as by performing a discrete transform thereto. For example, the discrete transform can include a discrete cosine transform (DCT), a discrete sine transform (DST), or an integer transform (IT). If the residue is compressed, the similarity data associated with the first matching block 810 can include a discrete transform coefficient of the residue. In some implementations, the discrete transform coefficient can be quantized before being included in the similarity data. In some implementations, the similarity data can include a predetermined number of discrete transform coefficients, such as the first n discrete transform coefficients, in which n is an integer.

The residue can be used to improve the precision of the error concealment. For example, after duplicating the first matching block 810 to replace the current block 808 when decoding the current slice 804, the residue that has been transmitted to the decoder (e.g., as out-of-band data) can be added to the duplicated block. If the residue is transformed and/or quantized, it can be dequantized and/or inverse transformed before being added to the duplicated block.

In FIG. 8, the first slice is in the current picture 800 with the current slice 804. In some implementations, the first slice can be in a different picture. FIG. 9 is a diagram of another example similarity vector for error concealment according to implementations of this disclosure. In FIG. 9, the picture 800 is the current picture as described in FIG. 8. A picture 900 can represent a previous picture that is temporally prior to the picture 800. It should be noted that the picture 900 may or may not be immediately prior to the picture 800. The picture 900 also includes 6×6 blocks (indicated by dotted lines) that are divided into slices 902, 904, and 906 (indicated by solid lines). It should be noted that the blocks and slices of the picture 900 are only examples. The slice-partition scheme of the previous picture can be the same as or different from the slice-partition scheme of the current picture.

In FIG. 9, the recovery data of the current block 808 in the current slice 804 is being determined. The recovery data can include similarity data associated with a second matching block 908. The second matching block 908 is determined to be the best-matching block of the current block 808 in a search range. The search range can be the slices 902 and 904. The second matching block 908 can be determined by applying a block-matching technique in the slices 902 and 904. The block-matching technique can have a quarter-pel search precision, for example. As shown in FIG. 9, the second matching block 908 can cross a boundary between the slices 902 and 904. It should be noted that the best-matching block of the current block 808 can be in any location within the search range, not necessarily being entirely within a slice.

A similarity vector 910 can be determined to indicate a relative position between the second matching block 908 and the current block 808. For example, the current block 808 can be co-located with a co-located block 912, as indicated in a dashed double-arrow line 914, which has the same relative location in a picture as in the first picture 808. The similarity vector 910 can indicate the relative position between the second matching block 908 and the co-located block 912. Because the current block 808 and the second matching block 908 are in different pictures, the relative relationship therebetween can be described as temporal, and the similarity vector 910 can be referred to as a temporal similarity vector (TSV) 910. In FIG. 9, the TSV 910 is a vector from a top left corner of the co-located block 912 to a top left corner of the second matching block 908. Similar to the example related to the SSV 812, the TSV 910 and the second matching block 908 can be used to recover the current block 808 at a decoder if packets of the current block 808 are lost or corrupted. For example, after the picture 900 being correctly decoded, based on the TSV 910 that has been transmitted to the decoder (e.g., as out-of-band data), the second matching block 908 that has been decoded can be duplicate to replace the current block 808 when decoding the current slice 804.

Using SSVs and TSVs for error concealment can have different advantages. For example, when the current picture is in a rapid scene transition (e.g., detected by using a scene-transition detection technique), the SSV can be easier to determine and recovering the current block using the SSV can be more accurate. When the current picture is in a static scene, the TSV can be easier to determine and recovering the current block using the TSV can be more accurate. Depending on scene types and other considerations, different strategies can be used to determine whether an SSV, a TSV, or a combination thereof would be used for error concealment.

In some implementations, similar to the residue associated with the SSV 812, a residue (e.g., pixel value differences) can be determined between the current block 808 and the second matching block 908 and included in the similarity data associated with the second matching block 908. The residue can be associated with the TSV 910 (referred to as a "TSV-associated residue"). The residue can be processed (e.g., transformed and/or quantized) and used to improve the precision of the error concealment in a similar way to the residue associated with the SSV 812, which will not be detailed hereinafter.

The similarity data associated with the first block can include any number of any combination of an SSV, a TSV, and residue data (e.g., a discrete transform coefficient of the residue). To limit the size of the recovery data and transmission load, the size of the residue data can be limited. For example, the number of the discrete transform coefficients of the residue can be small (e.g., 1, 2, 3, 4, 5, or any suitable small number depending on balance between the accuracy of the recovery and the size of the recovery data). For example, the similarity vector can include only the SSV (e.g., the SSV 812), only the TSV (e.g., the TSV 910), or a combination of the SSV and the TSV. The similarity data can include only the similarity vector (e.g., the SSV 812 and/or the TSV 910), or a combination of the similarity vector and the residue data associated with the similarity vector.

When the similarity vector includes only the SSV (e.g., the SSV 812), the residue data can include only SSV-associated residue. When the similarity vector includes only the TSV (e.g., the TSV 910), the residue data can include only TSV-associated residue. When the similarity vector includes a combination of the SSV and the TSV, the residue data can include a combination residue. The combination residue can be determined as pixel value differences (e.g., as a result of subtraction) between pixels of the current block and pixels of a weighted block. The weighted block can be determined as a weighted sum of a first matching block associated with the SSV (e.g., the first matching block 808) and a second matching block associated with the TSV (e.g., the first matching block 908), which will be set forth in descriptions related in FIG. 10 and Eqs. (1)-(3).

In some implementations, the generation of the similarity data can be optimized based on the prediction mode of the current slice. For example, if the current slice (e.g., the slice 804) is encoded using intra-prediction, the search range associated with the current block (e.g., the current block 808) can be limited to part or all of the current picture, excluding the current slice (e.g., the slice 804), and the similarity vector can be determined as an SSV (e.g., the SSV 812). For another example, if the current slice is encoded using inter-prediction, the search range can be extended to include part or all of a previous picture (e.g., the picture 900), and the similarity vector can be determined as a TSV (e.g., the TSV 910). It should be noted that the prediction mode of the current slice is independent of the selection of the types of the similarity vectors. For example, no matter what prediction mode is used for the current slice, the similarity vector can always include an SSV, a TSV, or a combination thereof.

In some implementations, to optimize the generation of the similarity data and reduce computation resources and time, some ME and/or MC data can be used as part of the similarity data. For example, if the current slice is encoded using inter-prediction and the search range includes, in a previous picture, a slice that is a reference slice of the current slice, a motion vector associated with the current block can be determined as the similarity vector (e.g., as a TSV). A block associated with the motion vector (e.g., a motion-estimated block) in the slice can be determined as the best-matching block for error concealment. A residual block generated from MC and ME can be determined as the residue associated with the similarity vector.

In some implementations, if multiple best-matching blocks are determined and the similarity data includes multiple similarity vectors, the similarity data can further include a weight associated with each of the similarity vectors. The multiple similarity vectors can include any number of any combination of an SSV and a TSV. (e.g., an SSV and a TSV, two SSVs, two TSVs, or three SSVs and two TSV). The multiple best-matching blocks and the multiple similarity vectors can be used for determining a weighted block. The weighted block can be used for error concealment of the current block. The more best-matching blocks are used to determine the weighted block, the better quality of recovery the weighted block can have. Also, using multiple best-matching blocks and the multiple similarity vectors can be more error resilient because the recovery of the lost or corrupted block can still be performed when some of the multiple similarity vectors are lost or corrupted.

FIG. 10 is a diagram of two example similarity vectors for error concealment according to implementations of this disclosure. In FIG. 10, the picture 800 is the current picture as shown and described in FIG. 8, and the picture 900 is the previous picture as shown and described in FIG. 9.

In FIG. 10, the similarity data can include the SSV 812 and the TSV 910. The similarity data can further include a first weight associated with the SSV 812, a second weight associated with the TSV 910, or a combination thereof. The weighted block can be determined as a weighted sum of the first matching block 810 and the second matching block 908.

The first weight and the second weight can have a fixed or adaptive value. In some implementations, the first weight and the second weight can be fixed values for the same type of similarity vector. That is, the first weight and the second weight are independent of blocks and slices. For example, the first weight is the same for all SSVs of different blocks, and the second weight is the same for all TSVs of different blocks. The first weight and the second weight can also be variable values. The first weight and the second weight can be adaptive, depending on blocks or slices. In some implementations, the first weight and the second weight can be adaptive at a slice level. That is, similarity vectors of blocks of the same type (e.g., SSVs or TSVs) can be associated with the same weight value when the blocks are in the same slice and with different weight values when the blocks are in different slices. In some implementations, the first weight and the second weight can be adaptive at a block level. That is, similarity vectors of blocks of the same type can be associated with different weight values, no matter which slice or slices those blocks belong to. The adaptiveness level of the weight value can also be adjusted between different blocks. For example, a first block can have a weight value adaptive at a slice level, and a second block successive to the first block can have a weight value adaptive at a block level.

The adaptiveness of the weight values can be selected based on the balance between the accuracy of the recovery and the size of the recovery data. The higher level (e.g., the slice level) the weight values are adaptive to, the smaller size the recovery data can be and thus the smaller bandwidth is needed for transmitting the same. The lower level (e.g., the block level) the weight values are adaptive to, the more accurate the recovery can be.

In some implementations, the weight values can be determined from a predetermined set of values or in real-time. For example, the predetermined set can include a fixed number of values. For example, the predetermined set can include 5 values of {0, 0.25, 0.50, 0.75, 1.0} or 6 values of {0, 0.2, 0.4, 0.6, 0.8, 1.0}. The fixed number can depend on balance between amount of computation and accuracy of recovery. It should be noted that the predetermined set is not limited to the above examples. Each value of the predetermined set can be used to determine a candidate weighted block and a difference is calculated between the current block and the candidate weighted block. When the difference is minimal, the value used for that calculation can be determined as the selected weight. The difference can be, for example, a sum of absolute differences (SAD).

When the weight value is determined in real-time, no predetermined set of values is used, and a range of weight values can be used to determine the candidate weighted block. When the difference (e.g., SAD) between the current block and the candidate weighted block is minimal, the value used for that calculation can be determined as the selected weight.

In FIG. 10, a weighted block can be determined by determining a weighted sum of the first matching block 810 and the second matching block 908. For example, a value (e.g., a grayscale value, an RGB value, a brightness value, or a binary value) of a pixel of the first matching block 810 can be represented as S, and a value of a pixel of the second matching block 908 can be represented as T. For simplicity, without causing any ambiguity, values of a pixel will be referred to as a "pixel" herein unless explicitly stated otherwise. S and T can correspond to each other, such as having the same relative location in a block. It should be noted that S and T can also represent a group of pixels of the first matching block 810 and the second matching block 908, respectively. The first weight associated with the SSV 812 can be represented as $\alpha_1$, and the second weight associated with the TSV 910 can be represented as $\alpha_2$. A pixel of the weighted block represented as W and corresponding to S and T can be determined using Eq. (1):

$$W = \alpha_1 \cdot S + \alpha_2 \cdot T \qquad \text{Eq. (1)}$$

In some implementations, the first weight and the second weight can be complementary. That is, the sum of the first weight and the second weight can be a constant number (e.g., one). For example, $\alpha_2$ can be $(1-\alpha_1)$. In these implementations, W can be determined using Eq. (2):

$$W = \alpha_1 \cdot S + (1-\alpha_1) \cdot T \qquad \text{Eq. (2)}$$

The weight can be included in the similarity data. For example, when $\alpha_1$ and $\alpha_2$ are complementary, the weight can be stored as one binary bit (e.g., having a value of 1 or 0). That is, the weight can be used to indicate whether S or T will be used to determine the weighted block. For another example, the weight can be stored as multiple bits (e.g., binary, octal, decimal, or hexadecimal bits), which can provide non-integer values of S and T.

It should be noted that in Eqs. (1) and (2), $\alpha_1$ and $\alpha_2$ can be different for any different blocks. $\alpha_1$ and $\alpha_2$ can also be the same for blocks in the same slice but different for blocks in a different slice. $\alpha_1$ and $\alpha_2$ can also be the same for blocks in the same picture but different for blocks in a different picture. The values of $\alpha_1$ and $\alpha_2$ can be adjusted at any stage of the process 500.

It should be noted that the similarity data associated with the first block can include any number of any combination of the above examples. For example, the similarity data associated with the first block can include the similarity vector, the discrete transform coefficient of the residue, the weight associated with the first block, or a combination thereof. For example, the similarity data can include the discrete transform coefficient of the combination residue. The combination residue can be a difference between the current block and a weighted block determined from the first matching block and the second matching block (e.g., W in Eq. (1) or Eq. (2)). It should also be noted that the similarity data associated with the first block can include other forms of data indicative of similarity between the first block and the current block.

In some implementations, the non-similarity data can include a coefficient of a discrete transform performed to the current block. For example, the discrete transform can include a DCT, a DST, or an IT. In some implementations, the coefficient can include any number of any combination of a direct current (DC) coefficient of the discrete transform and an alternate current (AC) coefficient of the discrete transform.

For example, the non-similarity data can include the DC coefficient only. For another example, the non-similarity data can include the DC coefficient and at least one AC coefficient. To limit the size of the recovery data and transmission load, the number of the AC coefficients to be included in the non-similarity data can be small (e.g., 1, 2, 3, 4, 5, or any suitable small number depending on balance between the accuracy of the recovery and the size of the recovery data). In some implementations, the AC coefficients can include the first k AC components of the discrete transform, in which k is an integer. For example, the first k AC components can be the first k non-zero AC components. In some implementations, the order of the AC components can be determined by a scan order (e.g., a zig-zag order) of the current slice.

It should be noted that the recovery data can include any number of any combination of the above examples. For example, the recovery data can include at least one of the similarity data associated with the current block and the non-similarity data associated with the current block. It should also be noted that the recovery data can include other forms of data that can be used for error concealment.

It should also be noted that the types and numbers of the recovery data entries can be independent of different blocks. For example, for a first block, the recovery data can include the non-similarity data only. For a second block, the recovery data can include an SSV only. For a third block, the recovery data can include an SSV and SSV-associated residue data (e.g., a discrete transform coefficient of an SSV-associated residue). For a fourth block, the recovery data can include a TSV only. For a fifth block, the recovery data can include a TSV and TSV-associated residue data (e.g., a discrete transform coefficient of an TSV-associated residue). For a sixth block, the recovery data can include an SSV, a TSV, a first weight associated with the SSV, and a second weight (e.g., a complementary weight or a non-complementary weight) associated with the TSV. For a seventh block, the recovery data can include an SSV, a TSV, a first weight associated with the SSV, a second weight (e.g., a complementary weight or a non-complementary weight) associated with the TSV, and combination residue data (e.g., a discrete transform coefficient of a combination residue). The type of the recovery data for each block (e.g., the aforementioned first through seventh blocks) can be independently determined and does not depend on any spatial or temporal relationship between the blocks (e.g. whether those blocks, in space or in time, are all successive, partially successive, or all discrete). It should be noted that the above descriptions are examples only and not limit the specific implementations of the numbers and types of the recovery data for different blocks.

In some implementations, the recovery data can be packetized. One or more bits (e.g., a binary, octal, decimal, or hexadecimal bit) can be used in a header of a packet for indicating the numbers and types of the recovery data entries included in the packet. For example, a bit can be used to indicate whether similarity data or non-similarity data is included. When the similarity data is included, a second bit can be used to indicate whether only a similarity vector is included, or a similarity vector and a residue (e.g., a discrete transform coefficient of the residue) is included. When the similarity vector and the residue is included, a third bit can be used to indicate what type of the similarity vector (e.g., an SSV or a TSV) and/or the residue is. Additional bits can also be used to indicate the number of the non-similarity data entries (e.g., the number of the DC and/or the AC components) and the similarity data entries (e.g., the number of similarity vectors and the number of residues). It should be noted that the design of the bits is not limited to the above examples and any combination of any design of bits can be used for packet headers of the recovery data.

Referring back to the process 500, at operation 506, the current block and the recovery data are transmitted using a network. The current block is encoded and transmitted as in-band data and the recovery data is transmitted as out-of-band data. The term "in-band data" used herein refers to the main stream for video data transmission. The term "out-of-band data" refers to a separate stream for non-video data transmission, which is outside of the main stream. The separate stream can be logically or physically different from the main stream. For example, the main stream and the separate stream can be sent and received in different network paths (e.g., channels). For another example, the main stream and the separate stream can be sent and received in the same network path. The in-band or out-of-band data packets can be defined and controlled by a network transmission protocol. For example, a flag or indicator can be included in a header of a data packet to indicate whether this data packet is in-band or out-of-band. In some implementations, the recovery data can be transmitted as in-band data and out-of-band data for redundancy.

In some implementations, the in-band data can be network abstraction layer (NAL) units, and the out-of-band data can be SEI data (e.g., an SEI message). The recovery data can have a small overall size to be transmitted out of band, which can reduce the risk of packet loss or damage during transmission.

To further reduce the size of the recovery data for out-of-band transmission, the recovery data can be further compressed. In some implementations, differential pulse-code modulation (DPCM) can be used for encoding recovery data of successive blocks. In some implementations, the DPCM-encoded recovery data can be further compressed using variable length coding (VLC).

For example, when the recovery data comprises the coefficients of the discrete transform performed to a current block (e.g., the DC and/or AC components), the coefficients can be quantized. The difference between a quantized DC component of the current block and a quantized DC component of its neighbor block (e.g., an immediately previous block) can be encoded by VLC (e.g., Huffman coding). In some implementations, when the current block has no previous neighbor block (e.g., the very current block of each slice), the difference of the DC components can be determined as a difference between the DC component of the current block and a constant value. A quantized AC component can form pairs of zero-run lengths and values, and then be coded by VLC (e.g., Huffman coding).

For another example, when the recovery data comprises a similarity vector (e.g., an SSV and/or a TSV), a horizontal component (e.g., a scalar value indicative of the horizontal magnitude of the similarity vector) and/or a vertical component (e.g., a scalar value indicative of the vertical magnitude of the similarity vector) of the similarity vector can be quantized. The quantized horizontal and/or vertical components can also be coded using VLC.

For another example, when the recovery data comprises a discrete transform coefficient of the residue associated with the similarity vector, the discrete transform coefficient can be quantized. The quantized discrete transform coefficient can also further be coded using VLC.

In some implementations, the quantization scheme and/or the VLC techniques used can be independent between slices. That is, the quantization scheme and/or the VLC techniques can be the same for blocks of the same slice and be different for blocks in a different slice.

It should be noted that, only one type of the recovery data will be used for error concealment at a decoder. That is, for error concealment, the decoder can use only the similarity data or only the non-similarity data, but not both the similarity data and the non-similarity data. Correspondingly, the recovery data to be transmitted can include only the similarity data or only the non-similarity data. In some implementations, in a lossy or noisy network, the recovery data to be transmitted can include, as redundancy, a combination of the similarity data and the non-similarity data. For example, when one of the similarity data and the non-similarity data is lost during transmission at the decoder, the decoder can still rely on the other for error concealment. It should be noted that the schemes of combination of the similarity data and the non-similarity data for transmission are not limited herein.

It should also be noted that, different numbers and types of the similarity data can be transmitted for redundancy but not all of them is needed for error concealment. For example, the transmitted similarity data can include an SSV, SSV-associated residue data, a TSV, and TSV-associated residue data, but the decoder can use only the SSV (or TSV) and SSV-associated residue data (or TSV-associated residue data) for error concealment. It should be noted that the numbers and types of the similarity data for transmission are not limited herein.

Figure 6:
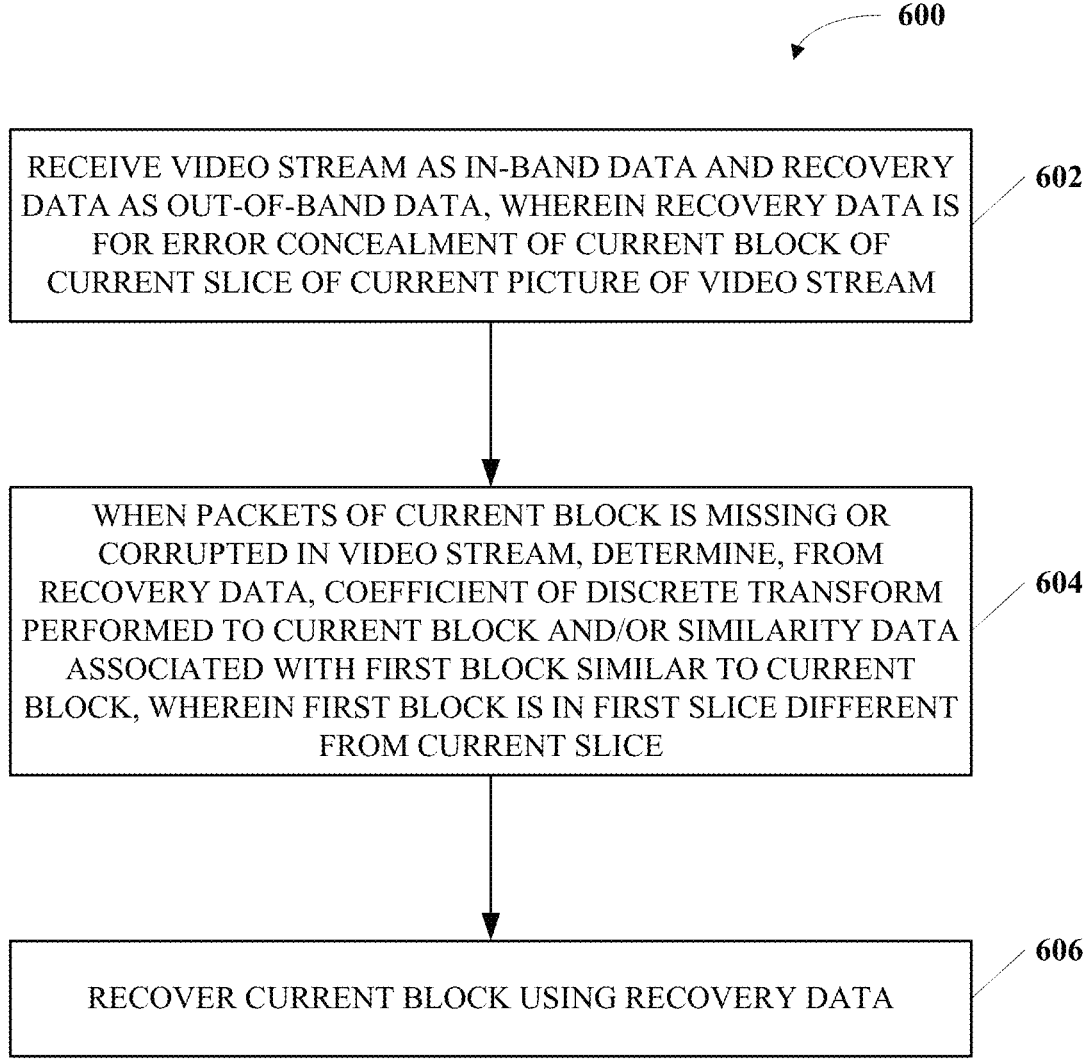
FIG. 6 is a flowchart of an example process for error concealment for a video decoding process according to implementations of this disclosure.

FIG. 6 is a flowchart of an example process 600 for error concealment for a video decoding process according to implementations of this disclosure. The process 600 can be implemented as software and/or hardware modules in the system 100 in FIG. 1. For example, the process 600 can be implemented as software modules of a server in the network 106. The process 600 can also be implemented as of software modules of an end-user apparatus (e.g., the apparatus 104). The software modules can be stored in a memory (e.g., the memory 118) as instructions and/or data executable by a processor (e.g., the processor 116). The process 600 can also be implemented in hardware as a specialized chip storing instructions executable by the specialized chip. For example, the specialized chip can include a special hardware acceleration module.

It should be noted that the process 600 can be implemented as an integrated or independent process of a video decoding process (e.g. the process 400). That is, operations of the process 600 can be implemented as additional or integrated operations of the process 400, or as independent operations that are performed separately from the process 400. If the process 600 is implemented as independent from the process 400, it can be implemented before, concurrent with, or after the performing of the process 400.

At operation 602, a video stream is received as in-band data and recovery data is received as out-of-band data. The video stream and the recovery data can be received by a processor (e.g. the processor 108 or 116). The recovery data is for error concealment of a current block of a current slice of a current picture of the video stream.

At operation 604, based on a determination that packets the current block is missing or corrupted in the video stream, a coefficient of a discrete transform associated with the current block, similarity data associated with a first block, or a combination thereof is determined from the recovery data. The discrete transform has been performed to the current block during encoding. The first block is similar to the current block and in a first slice different from the current slice. In some implementations, the current block and the first block can be an MB, a CU, a CTU, or any logical unit of video data for video coding, depending on different video coding standards.

In some implementations, the coefficient of the discrete transform and/or the similarity data can be determined before reconstructing (e.g., before the reconstruction stage 410 in the process 400) the current block, the current slice, or the current picture. In some implementations, the recovery data can be determined after reconstructing the current block, the current slice, or the current picture.

In some implementations, the coefficient can be similar to the coefficient as described in the process 500. For example, the coefficient can include at least one of a DC coefficient of the discrete transform and an AC coefficient of the discrete transform. The discrete transform can include a DCT, a DST, or an IT.

In some implementations, the similarity data associated with the first block comprises any number of any combination of a similarity vector indicative of a position of the first block relative to the current block, a discrete transform coefficient of a residue that is a difference between the current block and the first block, and a weight associated with the first block for determining a weighted block. The similarity vector, the discrete transform coefficient of the residue, and the weight associated with the first block can be similar to the same as described in the process 500. For example, the similarity vector can include any number of any combination of an SSV and a TSV as described in FIGS. 8-10. For example, the weighted block can be determined using at least a first matching block and a second matching block. The first matching block is similar to the current block and in the first slice, and the second matching block is similar to the current block and in a second slice. The current slice, the first slice, and the second slice can be different from each other.

In some implementations, the first slice can be in the current picture, and the second slice can be in a previous picture prior to the current picture in the video stream. The similarity vector can include an SSV indicative of the position of the first matching block relative to the current block and a TSV indicative of a position of the second matching block relative to the current block.

In some implementations, the discrete transform coefficient of the residue can include a discrete transform coefficient of an SSV-associated residue, a discrete transform coefficient of a TSV-associated residue, or a discrete transform coefficient of a combination residue. The SSV-associated residue can be a difference between the current block and the first matching block. The TSV-associated residue can be a difference between the current block and the second matching block. The combination residue can be a difference between the current block and a weighted block determined from the first matching block and the second matching block (e.g. the weighted block Win Eq. (1) or (2)).

In some implementations, the weight associated with the first block can include a first weight associated with the first matching block and a second weight associated with the second matching block. In some implementations, the first weight and the second weight can be complementary.

Referring back to the process 600, at operation 606, the current block is recovered using the recovery data. In some implementations, when the recovery data includes the coefficient of the discrete transform associated with the current block, the current block can be recovered by performing an inverse discrete transform to the coefficient (e.g., the DC component and/or at least one AC component). For example, the inverse discrete transform can include an inverse DCT, an inverse DST, or an inverse IT.

In some implementations, when the recovery data includes the similarity vector, the current block can be recovered by duplicating the first block as the current block. The position of the first block can be determined using the similarity vector and a position (e.g., the top left corner) of the current block.

In some implementations, when the recovery data includes the similarity vector and the discrete transform coefficient of the residue, the current block can be recovered by duplicating the first block and adding the residue. The residue can be determined from the discrete transform coefficient of the residue. For example, an inverse discrete transform (e.g., an inverse DCT, an inverse DST, or an inverse IT) can be performed to the discrete transform coefficient of the residue.

In some implementations, when the recovery data includes the similarity vector and the similarity vector includes an SSV associated with a first matching block, a TSV associated with a second matching block, and a weight associated with at least one of the SSV and the TSV, the current block can be recovered as a weighted block. For example, the weight can include a first weight associated with the first matching block and a second weight associated with the second matching block. For example, the weighted block can be determined as a sum of: a first product of the first matching block and the first weight (e.g., $\alpha_1 \cdot S$ in Eq. (1)), and a second product of the second matching block and the second weight (e.g., $\alpha_2 \cdot T$ in Eq. (1)). For example, a pixel of the weighted block can be determined in accordance with the Eq. (1). For another example, when the first weight and the second weight is complementary, the pixel of the weighed block can be determined in accordance with the Eq. (2).

In some implementations, when the recovery data includes the SSV, the TSV, the weight, and the discrete transform coefficient of the combination residue, the weighted block can be determined as a sum of the first product, the second product, and the combination residue. For example, the combination residue R can be determined by performing an inverse discrete transform (e.g., an inverse DCT, an inverse DST, or an inverse IT) to the discrete transform coefficient associated with the combination residue. A pixel of the weighted block W can be determined using Eq. (3):

$$W = \alpha_1 \cdot S + (1-\alpha_1) \cdot T + R \qquad \text{Eq. (3)}$$

In some implementations, when using the recovery data to recover the lost or corrupted block at a decoder, artifacts can occur in decoded pictures, such as being blocky. To reduce recovery artifacts, optimally, a deblocking filter (e.g., a low-pass filter) can be applied for boundary pixels of a recovered block and its neighboring blocks. The deblocking filter can be applied after the operation 606. For example, the deblocking filter can be integrated into the loop filter of the process 400. For another example, the deblocking filter can be applied as a separate filter independent from the loop filter of the process 400.

Figure 7:
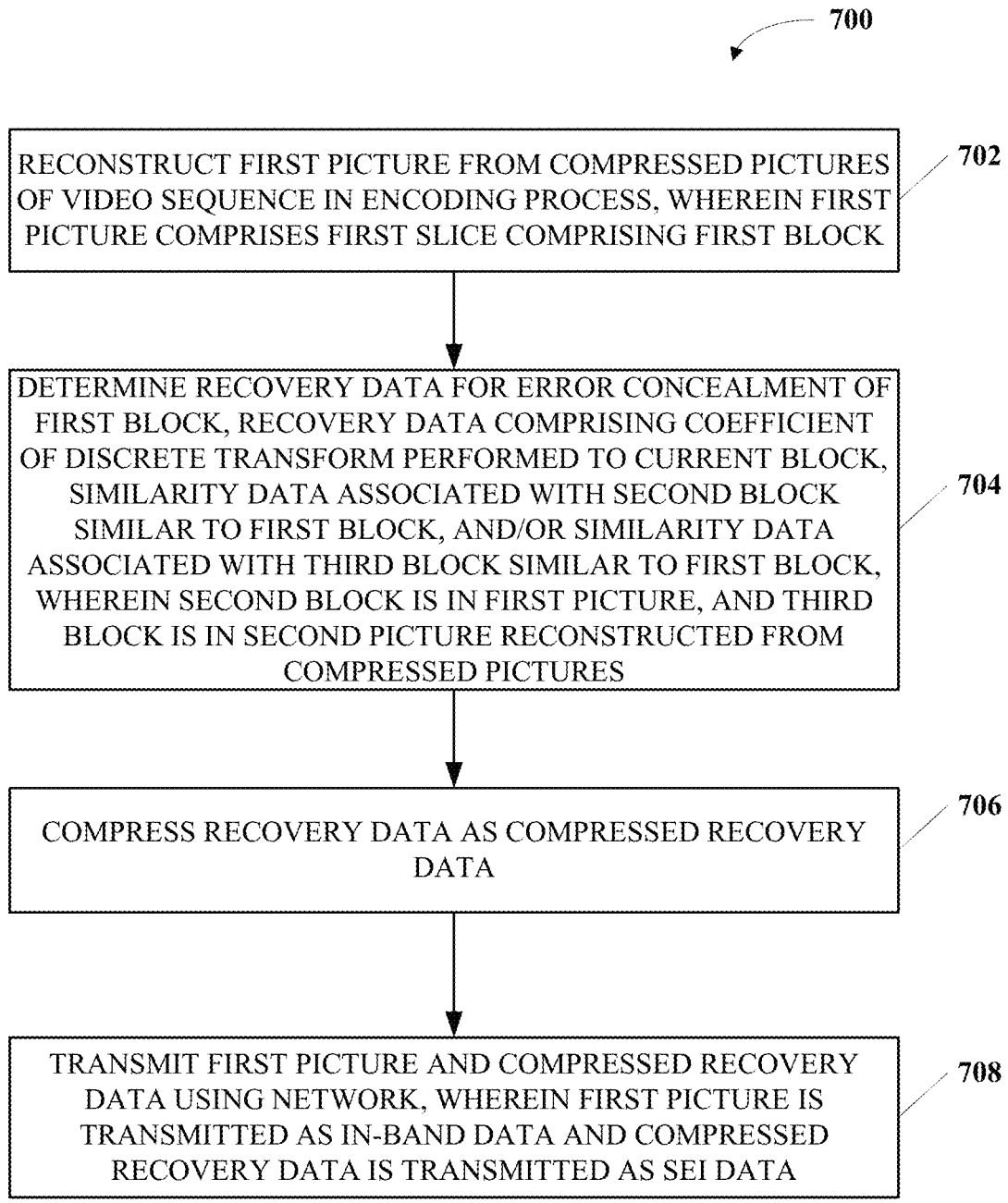
FIG. 7 is a flowchart of another example process for error concealment for a video encoding process according to implementations of this disclosure.

FIG. 7 is a flowchart of an example process 700 for error concealment for a video encoding process according to implementations of this disclosure. The process 700 can be performed as another example implementation of determining recovery data for error concealment during the video encoding process. The process 700 can be implemented as software and/or hardware modules in the system 100 in FIG. 1. For example, the process 700 can be implemented as software modules of a server in the network 106. The process 700 can also be implemented as of software modules of an end-user apparatus (e.g., the apparatus 102). The software modules can be stored in a memory (e.g., the memory 110) as instructions and/or data executable by a processor (e.g., the processor 108). The process 700 can also be implemented in hardware as a specialized chip storing instructions executable by the specialized chip. For example, the specialized chip can include a special hardware acceleration module.

It should be noted that the process 700 can be implemented as an integrated or independent process of a video encoding process (e.g. the process 300). That is, operations of the process 700 can be implemented as additional or integrated operations of the process 300, or as independent operations that are performed separately from the process 300. If the process 700 is implemented as independent from the process 300, it can be implemented before, concurrent with, or after the performing of the process 300.

At operation 702, a first picture is reconstructed from compressed pictures of a video sequence in a video encoding process. The first picture includes a first slice, and the first slice includes a first block. For example, the first picture can be reconstructed in a reconstructing path in a video encoding process (e.g., the process 300), such as an output of the reconstruction stage 312. The first block and first slice are determined for error concealment.

It should be also noted that the picture partition scheme for error concealment can be independent from the picture partition scheme for encoding the current picture. For example, the granularity of the partition or division of the current picture for the above two purposes can be different. For another example, the current picture can be partitioned to a first number (e.g., 3) slices for encoding and partitioned to a second number (e.g., 4) slices for error concealment.

At operation 704, recovery data for error concealment of the first block is determined. The recovery data can include similarity data associated with a second block similar to the first block and/or similarity data associated with a third block similar to the first block. The second block can be in the first picture (e.g., a slice of the first picture different from the first slice). The third block can be in a second picture reconstructed from the compressed pictures.

In some implementations, a block similar to the first block can be determined as a best-matching block of the first block within a search range associated with the first block. The best-matching block and the search range can be similar to the same as described in the processes 500 and 600. For example, the search range excludes the first slice and can include at least one of a slice of the first picture and a slice of the second picture.

In some implementations, a block-matching technique can be applied for the first block in the search range. At least one best-matching block of the first block can be determined in the search range. The second block can be the best-matching block of the first block in the slice of the first picture, and the third block can be the best-matching block of the first block in the slice of the second picture.

In some implementations, the similarity data can be similar to the similarity data as described in the processes 500 and 600. For example, the recovery data can include any number of any combination of the similarity data associated with the second block, the similarity data associated with the third block, and a coefficient of a discrete transform (e.g., a DCT, a DST, or an IT) performed to the first block. For example, the coefficient can include a DC coefficient of the discrete transform and a small number of (e.g., 1, 2, 3, 4, 5, or any suitable small number depending on balance between bandwidth and recovery accuracy) AC coefficient of the discrete transform.

In some implementations, the similarity data associated with the second block can include any number of any combination of an SSV indicative of a position of the second block relative to the first block, a weight associated with at least one of the second block and the third block (e.g., two independent weights $\alpha_1$ and $\alpha_2$ as in Eq. (1), or a pair of complementary weights $\alpha_1$ and $(1-\alpha_1)$ as in Eq. (2)), and a discrete transform coefficient of a combination residue that is a difference between the first block and a weighted block using the second block, the third block, and the weight. The similarity data associated with the third block can include any number of any combination of a TSV indicative of a position of the third block relative to the first block, the weight, and the discrete transform coefficient of the combination residue. A sum of the weight and the complementary weight is equal to one.

At operation 706, the recovery data is compressed as compressed recovery data. In some implementations, DPCM can be used for encoding recovery data of successive blocks. In some implementations, the DPCM-encoded recovery data can be further compressed using VLC. For example, the components (e.g., a horizontal and/or a vertical component) of the similarity vector and/or the discrete transform coefficient of the residue associated with the similarity vector can be compressed in a similar way as described in the process 500.

At operation 708, the first picture and the compressed recovery data is transmitted using a network. The first picture is transmitted as in-band data and the compressed recovery data is transmitted as SEI data. In some implementations, the in-band data can be NAL units.

As described above, a person skilled in the art will note that all or a portion of the aspects of the disclosure described herein can be implemented using a general-purpose computer/processor with a computer program that, when executed, carries out any of the respective techniques, algorithms, and/or instructions described herein. In addition, or alternatively, for example, a special-purpose computer/processor, which can contain specialized hardware for carrying out any of the techniques, algorithms, or instructions described herein, can be utilized.

The aspects of the disclosure described herein can be described in terms of functional block components and various processing operations. The disclosed processes and sequences may be performed alone or in any combination. Functional blocks can be realized by any number of hardware and/or software components that perform the specified functions. For example, the described aspects can employ various integrated circuit components, such as, for example, memory elements, processing elements, logic elements, look-up tables, and the like, which can carry out a variety of functions under the control of one or more microprocessors or other control devices. Similarly, where the elements of the described aspects are implemented using software programming or software elements, the disclosure can be implemented with any programming or scripting languages, such as C, C++, Java, assembler, or the like, with the various algorithms being implemented with any combination of data structures, objects, processes, routines, or other programming elements. Functional aspects can be implemented in algorithms that execute on one or more processors. Furthermore, the aspects of the disclosure could employ any number of conventional techniques for electronics configuration, signal processing and/or control, data processing, and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media and can include RAM or other volatile memory or storage devices that can change over time. A memory of an apparatus described herein, unless otherwise specified, does not have to be physically contained in the apparatus, but is one that can be accessed remotely by the apparatus, and does not have to be contiguous with other memory that might be physically contained in the apparatus.

Any of the individual or combined functions described herein as being performed as examples of the disclosure can be implemented using machine-readable instructions in the form of code for operation of any or any combination of the aforementioned hardware. The computational codes can be implemented in the form of one or more modules by which individual or combined functions can be performed as a computational tool, the input and output data of each module being passed to/from one or more further modules during operation of the methods and systems described herein.

Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. Moreover, use of the term "an aspect" or "one aspect" throughout this disclosure is not intended to mean the same aspect or implementation unless described as such.

As used in this disclosure, the term "or" is intended to mean an inclusive "or" rather than an exclusive "or" for the two or more elements it conjoins. That is unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. Similarly, "X includes one of A and B" is intended to be used as an equivalent of "X includes A or B." The term "and/or" as used in this disclosure is intended to mean an "and" or an inclusive "or." That is, unless specified otherwise or clearly indicated otherwise by the context, "X includes A, B, and/or C" is intended to mean that X can include any combinations of A, B, and C. In other words, if X includes A; X includes B; X includes C; X includes both A and B; X includes both B and C; X includes both A and C; or X includes all of A, B, and C, then "X includes A, B, and/or C" is satisfied under any of the foregoing instances. Similarly, "X includes at least one of A, B, and C" is intended to be used as an equivalent of "X includes A, B, and/or C."

The use of the terms "including" or "having" and variations thereof herein is meant to encompass the items listed thereafter and equivalents thereof as well as additional items. Depending on the context, the word "if" as used herein can be interpreted as "when," "while," or "in response to."

The use of the terms "a" and "an" and "the" and similar referents in the context of describing the disclosure (especially in the context of the following claims) should be construed to cover both the singular and the plural. Furthermore, unless otherwise indicated herein, the recitation of ranges of values herein is intended merely to serve as a shorthand method of referring individually to each separate value falling within the range, and each separate value is incorporated into the specification as if it were individually recited herein. Finally, the operations of all methods described herein are performable in any suitable order unless otherwise indicated herein or otherwise clearly contradicted by the context. The use of any and all examples, or language indicating that an example is being described (e.g., "such as"), provided herein is intended merely to better illuminate the disclosure and does not pose a limitation on the scope of the disclosure unless otherwise claimed.

This specification has been set forth with various headings and subheadings. These are included to enhance readability and ease the process of finding and referencing material in the specification. These headings and subheadings are not intended, and should not be used, to affect the interpretation of the claims or limit their scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for error concealment of video communications, comprising:
   determining, by a processor in an encoding process, a current block of a current slice of a current picture of a video sequence for error concealment;
   determining recovery data of the current block, wherein the recovery data comprises at least one of a coefficient of a discrete transform performed to the current block or similarity data associated with a first block similar to the current block, and the first block is in a first slice different from the current slice,
      wherein the similarity data associated with the first block comprises at least one of:
         a similarity vector indicative of a position of the first block relative to the current block,
         a weight associated with the first block for determining a weighted block using at least the first block and a second block similar to the current block,
         wherein the second block is in a second slice different from the current slice and the first slice, the first slice is in the current picture, and the second slice is in a previous picture prior to the current picture in the video sequence, or
         a discrete transform coefficient of a residue, wherein the residue is a difference between the current block and the one of the first block, the second block, or the weighted block,
      wherein the similarity vector comprises at least one of a spatial similarity vector (SSV) indicative of the position of the first block relative to the current block or a temporal similarity vector (TSV) indicative of a position of the second block relative to the current block;
   based on a determination that the current block is encoded using intra-prediction, determining the SSV as the similarity vector, wherein the recovery data comprises at least one of the SSV or the discrete transform coefficient of the residue, and the residue is a difference between the current block and the first block; p2 based on a determination that the current block is encoded using inter-prediction, determining the TSV as the similarity vector, wherein the recovery data comprises at least one of the TSV of the discrete transform coefficient of the residue, and the residue is a difference between the current block and the second block; and
   transmitting the current block and the recovery data using a network, wherein the current block is transmitted as in-band data and the recovery data is transmitted as out-of-band data.

2. The method of claim 1, wherein the current block comprises one of a macroblock, a coding unit (CU), a coding tree unit (CTU), or a coding tree block (CTB), and the out-of-band data comprises supplemental enhancement information (SEI) data.

3. The method of claim 1, wherein the coefficient comprises at least one of a direct current (DC) coefficient of the discrete transform or an alternate current (AC) coefficient of the discrete transform, and the discrete transform comprises one of a discrete cosine transform (DCT), a discrete sine transform (DST), or an integer transform (IT).

4. The method of claim 1, further comprising:
   based on a determination that the current slice is encoded using inter-prediction and the second slice is a reference slice of the current slice, determining a motion vector associated with the current block as the TSV, and a block in the second slice associated with the motion vector as the second block.

5. The method of claim 1, wherein the weight is one of a fixed value, a variable value adaptive at a slice level, or a variable value adaptive at a block level.

6. The method of claim 1, further comprising:
   determining, using a block-matching technique, at least one best-matching block of the current block in a search range associated with the current block, wherein the search range excludes the current slice and comprises at least one of a slice of the current picture or a slice of a previous picture prior to the current picture in the video sequence, and the at least one best-matching block comprises the first block.

7. A method for error concealment of video communications, comprising:
   receiving, by a processor, a video stream as in-band data and recovery data as out-of-band data, wherein the recovery data is for error concealment of a current block of a current slice of a current picture of the video stream;
   based on a determination that packets of the current block is missing or corrupted in the video stream, determining, from the recovery data, at least one of a coefficient of a discrete transform performed to the current block or similarity data associated with a first block similar to the current block, wherein the first block is in a first slice different from the current slice,
   wherein the similarity data associated with the first block comprises at least one of:
      a similarity vector indicative of a position of the first block relative to the current block,
      a weight associated with at least one of the first block or a second block similar to the current block, wherein the second block is in a second slice different from the current slice and the first slice, the first slice is in the current picture, and the second slice is in a previous picture prior to the current picture in the video stream, or a discrete transform coefficient of a residue, wherein the residue is a difference between the current block and one of the first block, the second block, or the weighted block, wherein the similarity vector comprises at least one of a spatial similarity vector (SSV) indicative of the position of the first block relative to the current block or a temporal similarity vector (TSV) indicative of a position of the second block relative to the current block, wherein the residue comprises at least one of an SSV-associated residue being a difference between the current block and the first block, a TSV-associated residue being a difference between the current block and the second block, or a combination residue being a difference between the current block and the weighted block; and recovering the current block using the recovery data.

8. The method of claim 7, wherein the current block comprises one of a macroblock, a coding unit (U), a coding tree unit (CTU), or a coding tree block (CTB), and the out-of-band data comprises supplemental enhancement information (SEI) data.

9. The method of claim 7, wherein the coefficient comprises at least one of a direct current (DC) coefficient of the discrete transform or an alternate current (AC) coefficient of the discrete transform, and the discrete transform comprises one of a discrete cosine transform (DCT), a discrete sine transform (DST), or an integer transform (IT).

10. The method of claim 7, wherein recovering the current block using the recovery data comprises:
based on a determination that the coefficient of the discrete transform is determined from the recovery data, recovering the current block by performing an inverse discrete transform to the coefficient.

11. The method of claim 7, wherein recovering the current block using the recovery data comprises at least one of:
based on a determination that the similarity vector is determined from the recovery data, duplicating one of the first block, the second block, or the weighted block as the current block, wherein the position of the one of the first block, the second block, or the weighted block is determined using the similarity vector and a position of the current block; or
based on a determination that the similarity vector and the discrete transform coefficient of the residue are determined from the recovery data, recovering the current block by duplicating one of the first block, the second block, or the weighted block and adding the residue determined from the discrete transform coefficient of the residue.

12. The method of claim 7, wherein
the discrete transform coefficient of the residue comprises at least one of a discrete transform coefficient of the SSV-associated residue, a discrete transform coefficient of the TSV-associated residue, or a discrete transform coefficient of the combination residue, and
the recovery data further comprises a complementary weight associated with the second block, wherein a sum of the weight and the complementary weight is equal to one.

13. The method of claim 12, wherein recovering the current block using the recovery data comprises at least one of:

based on a determination that the SSV is determined from the recovery data, determining the current block as a duplicate of the first block;
based on a determination that the TSV is determined from the recovery data, determining the current block as a duplicate of the second block;
based on a determination that the SSV, the TSV, and the weight are determined from the recovery data, determining the current block as a sum of a first product of the first block and the weight, and a second product of the second block and the complementary weight;
based on a determination that the SSV and the discrete transform coefficient associated with the SSV-associated residue are determined from the recovery data, determining the current block as a sum of the duplicate of the first block and the SSV-associated residue determined from the discrete transform coefficient associated with the SSV-associated residue;
based on a determination that the TSV and the discrete transform coefficient associated with the TSV-associated residue are determined from the recovery data, determining the current block as a sum of the duplicate of the second block and the TSV-associated residue determined from the discrete transform coefficient associated with the TSV-associated residue; or
based on a determination that the SSV, the TSV, the weight, the complementary weight, and the discrete transform coefficient of the combination residue are determined from the recovery data, determining the current block as a sum of:
the first product of the first block and the weight,
the second product of the second block and the complementary weight, and
the combination residue determined from the discrete transform coefficient associated with the combination residue.

14. An apparatus for error concealment of video communications, comprising:
a processor; and
a memory coupled to the processor, the memory configured to store instructions which when executed by the processor become operational with the processor to:
reconstruct a first picture from compressed pictures of a video sequence in an encoding process, wherein the first picture comprises a first slice comprising a first block;
determine recovery data for error concealment of the first block, the recovery data comprising at least one of a coefficient of a discrete transform performed to the current block, similarity data associated with a second block similar to the first block, or similarity data associated with a third block similar to the first block, wherein the second block is in the first picture, and the third block is in a second picture reconstructed from the compressed pictures, wherein the similarity data associated with the second block comprises at least one of:
a spatial similarity vector (SSV) indicative of a position of the second block relative to the first block,
a weight associated with the second block for determining a weighted block using at least the second block and the third block,
a discrete transform coefficient of an SSV-associated residue, wherein the SSV-associated residue is a difference between the first block and the second block, or a discrete transform coefficient of a combination residue, wherein the combination residue is a difference between the first block and the weighted block, wherein the similarity data associated with the third block comprises at least one of:
- a temporal similarity vector (TSV) indicative of a position of the third block relative to the first block,
- a complementary weight associated with the third block, wherein the TSV-associated residue is a difference between the first block and the third block, or
- the discrete transform coefficient of the combination residue;

compress the recovery data as compressed recovery data; and transmit the first picture and the compressed recovery data using a network, wherein the first picture is transmitted as in-band data and the compressed recovery data is transmitted as supplemental enhancement information (SEI) data.

15. The apparatus of claim 14, wherein the coefficient comprises a direct current (DC) coefficient of the discrete transform and an alternate current (AC) coefficient of the discrete transform, and the discrete transform comprises one of a discrete cosine transform (DCT), a discrete sine transform (DST), or an integer transform (IT).

16. The apparatus of claim 14, wherein the memory further comprises instructions which when executed by the processor become operational with the processor to:

determine, using a block-matching technique, at least one best-matching block of the first block in a search range associated with the first block, wherein the search range excludes the first slice and comprises at least one of a slice of the first picture or a slice of the second picture, the second block is the best-matching block of the first block in the slice of the first picture, and the third block is the best-matching block of the first block in the slice of the second picture.

* * * * *